(12) United States Patent
Hipwell, Jr. et al.

(10) Patent No.: US 6,831,539 B1
(45) Date of Patent: Dec. 14, 2004

(54) MAGNETIC MICROACTUATOR FOR DISC WITH INTEGRATED HEAD CONNECTIONS AND LIMITERS DRIVES

(75) Inventors: Roger Lee Hipwell, Jr., Eden Prairie, MN (US); Andrew David White, Brooklyn Park, MN (US); Zine-Eddine Boutaghou, Vadnais Heights, MN (US); Wayne Allen Bonin, North Oak, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/650,392

(22) Filed: Aug. 28, 2003

(51) Int. Cl.$^7$ ............................... G11B 5/48; H01F 3/00
(52) U.S. Cl. ................... 335/277; 335/274; 360/294.3; 29/603.01; 29/603.07
(58) Field of Search ................................. 335/257, 274, 335/277; 310/12–15; 360/294–294.7; 29/602.1, 603.01, 603.07

(56) References Cited

U.S. PATENT DOCUMENTS

| | | |
|---|---|---|
| 5,189,578 A | 2/1993 | Mori et al. |
| 5,276,573 A | 1/1994 | Harada et al. |
| 5,303,105 A | 4/1994 | Jorgenson |
| 5,364,742 A | 11/1994 | Fan et al. |
| 5,375,033 A | 12/1994 | MacDonald |
| 5,521,778 A | 5/1996 | Boutaghou et al. |
| 5,629,918 A | 5/1997 | Ho et al. |
| 5,638,267 A | 6/1997 | Singhose et al. |
| 5,657,188 A | 8/1997 | Jurgenson et al. |
| 5,711,063 A | 1/1998 | Budde et al. |
| 5,745,319 A | 4/1998 | Takekado et al. |
| 5,764,444 A | 6/1998 | Imamura et al. |
| 5,781,381 A | 7/1998 | Koganezawa et al. |
| 5,796,558 A | 8/1998 | Hanrahan et al. |
| 5,801,472 A | 9/1998 | Wada et al. |
| 5,805,375 A | 9/1998 | Fan et al. |
| 5,808,384 A | 9/1998 | Tabat et al. |
| 5,856,896 A | 1/1999 | Berg et al. |
| 5,863,024 A | 1/1999 | Blind et al. |
| 5,867,347 A | 2/1999 | Knight et al. |

(List continued on next page.)

FOREIGN PATENT DOCUMENTS

| | | |
|---|---|---|
| EP | 0 412 221 B1 | 11/1989 |
| JP | 63-122069 | 5/1988 |
| JP | 02-263369 | 10/1990 |
| JP | 04-134681 A | 5/1992 |
| JP | 04-368676 A | 12/1992 |
| JP | 05-094682 A | 4/1993 |
| JP | 06-020412 A | 1/1994 |
| JP | 07-085621 A | 3/1995 |

OTHER PUBLICATIONS

"Batch Transfer of Microstructures Using Flip–Chip Solder Bump Bonding" by Angah Signh et al.

(List continued on next page.)

Primary Examiner—Ramon M. Barrera
(74) Attorney, Agent, or Firm—Kinney & Lange, P.A.

(57) ABSTRACT

A microactuator design and fabrication method for an improved magnetic microactuator incorporating mechanical stroke limiters and integrated connections between the flex on suspension and slider. The stroke limiters, also referred to as bumper system, and integrated connections enable low power, mechanically robust operation of the microactuator during high seek operations. In addition, improved head gimbal assembly yield results due to the integrated head connections formed on the microactuator.

22 Claims, 22 Drawing Sheets

U.S. PATENT DOCUMENTS

| | | | |
|---|---|---|---|
| 5,883,759 | A | 3/1999 | Schulz |
| 5,896,246 | A | 4/1999 | Budde et al. |
| 5,898,541 | A | 4/1999 | Boutaghou et al. |
| 5,898,544 | A | 4/1999 | Krinke et al. |
| 5,920,441 | A | 7/1999 | Cunningham et al. |
| 5,936,805 | A | 8/1999 | Imaino |
| 5,945,898 | A | 8/1999 | Judy et al. |
| 5,959,808 | A | 9/1999 | Fan et al. |
| 6,043,957 | A | 3/2000 | Hattori et al. |
| 6,064,550 | A | 5/2000 | Koganezawa |
| 6,262,868 | B1 | 7/2001 | Arya et al. |
| 6,268,984 | B1 | 7/2001 | Boutaghou |
| 6,396,667 | B1 | 5/2002 | Zhang et al. |
| 6,414,822 | B1 | 7/2002 | Crane et al. |
| 6,414,823 | B1 | 7/2002 | Crane et al. |

OTHER PUBLICATIONS

"Batch Micropacking By Compression–Bonding Wafer–Wafer Transfer" by Micheal M. Maharbiz et al.

"Silicon Micromachined Electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" Koganezawa et al, *IEEE Transactions on Magnetics*, vol. 32, No. 5, Sep. 1996.

"Transverse–Mode Electrostatic Microactuator for MEMS–Based HDD Slider" by Imamura et al, *IEEE* 1996.

"An Experiment for Head Positioning System Using Sub-micron Track–width GMR Head" by Yoshikawa et al:, *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp 119–126.

"A Dual–Stage Magnetic Disk Drive Actuator Using a Piezoelectric Device for a High Track Density" by Mori et al:, *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

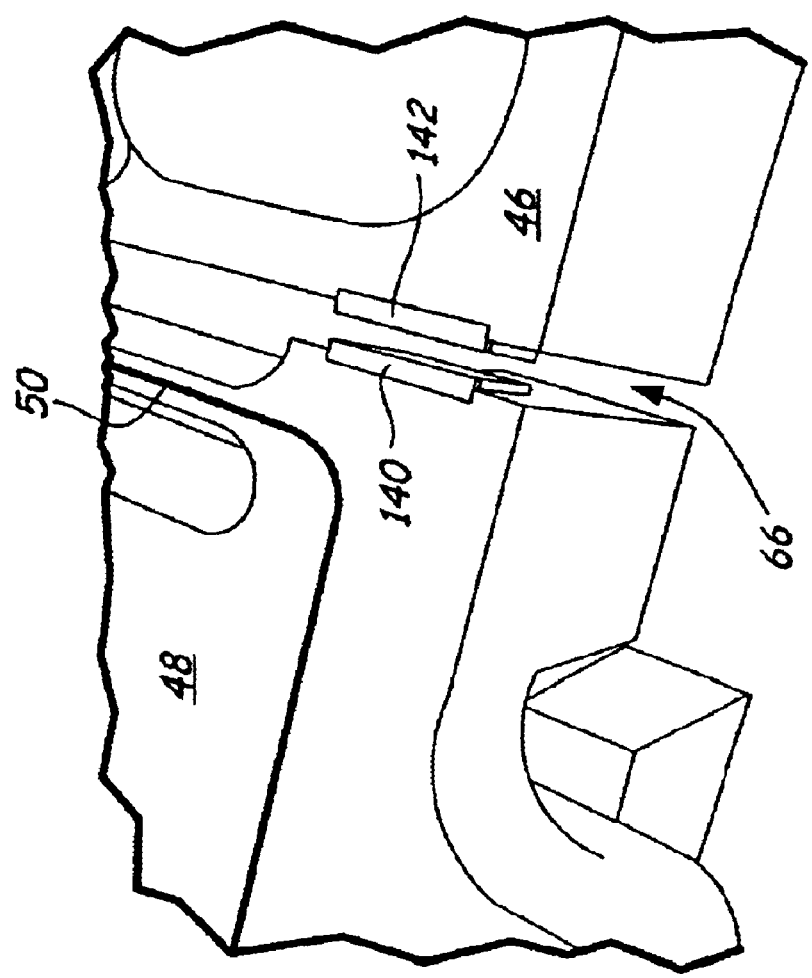

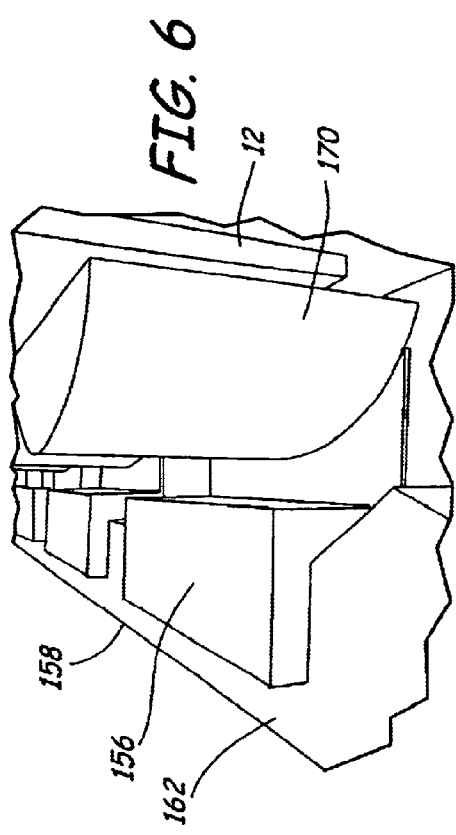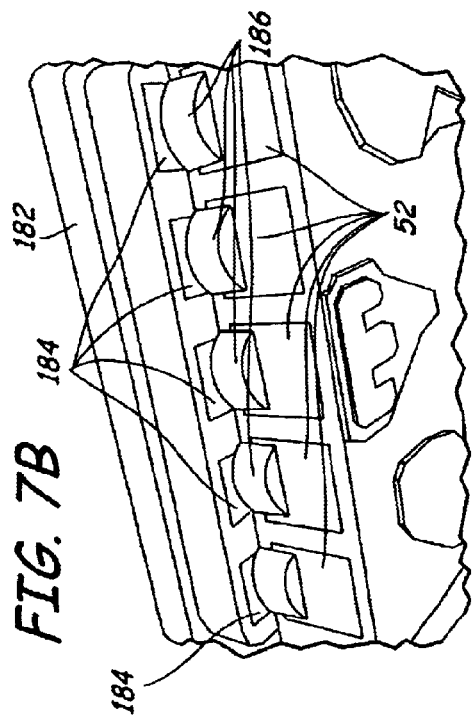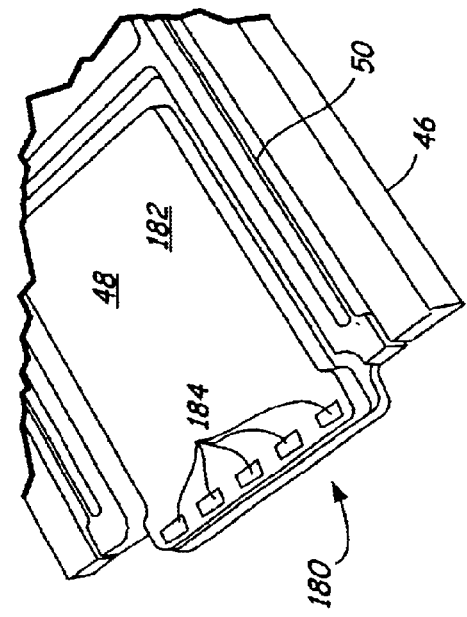

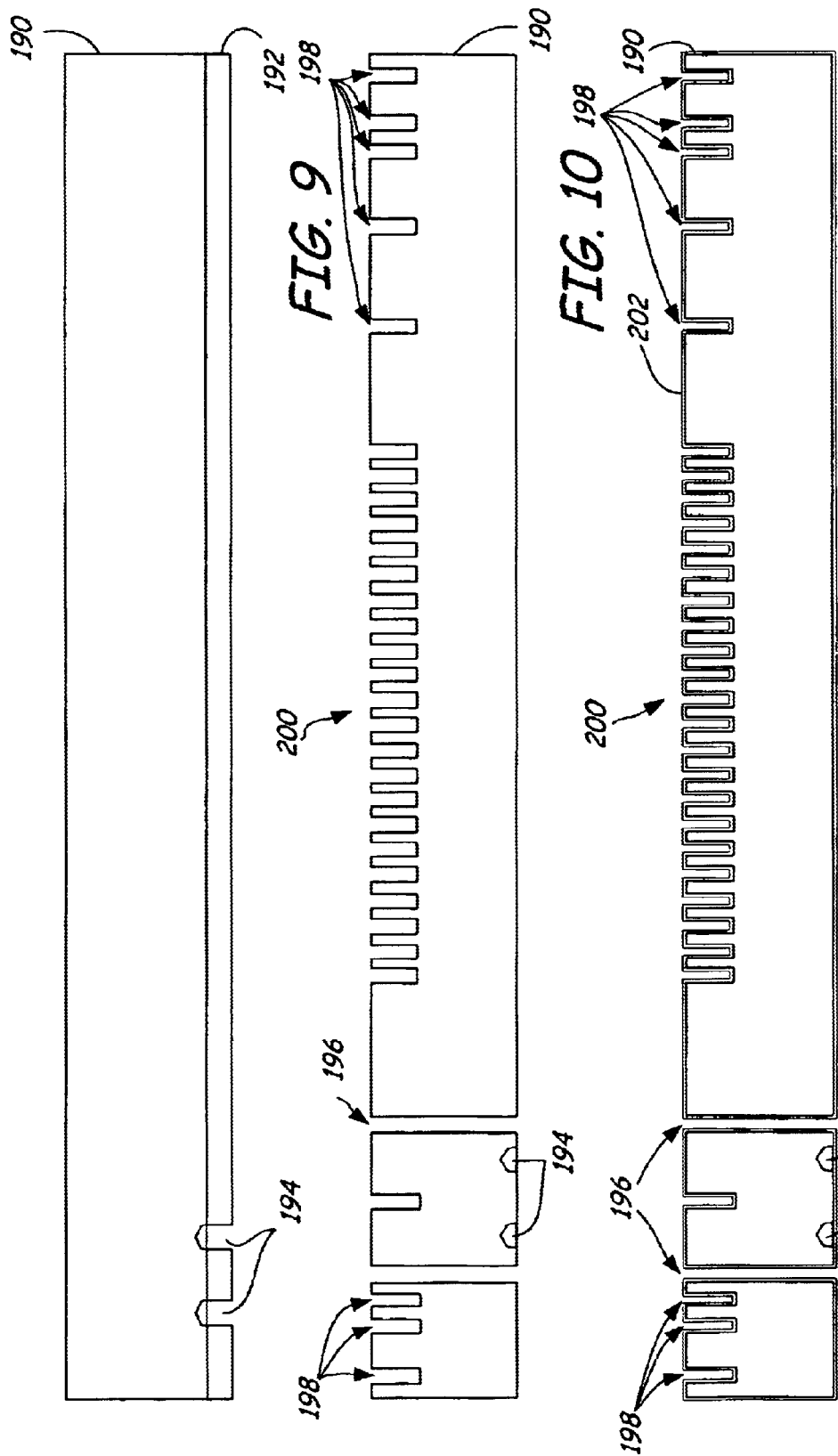

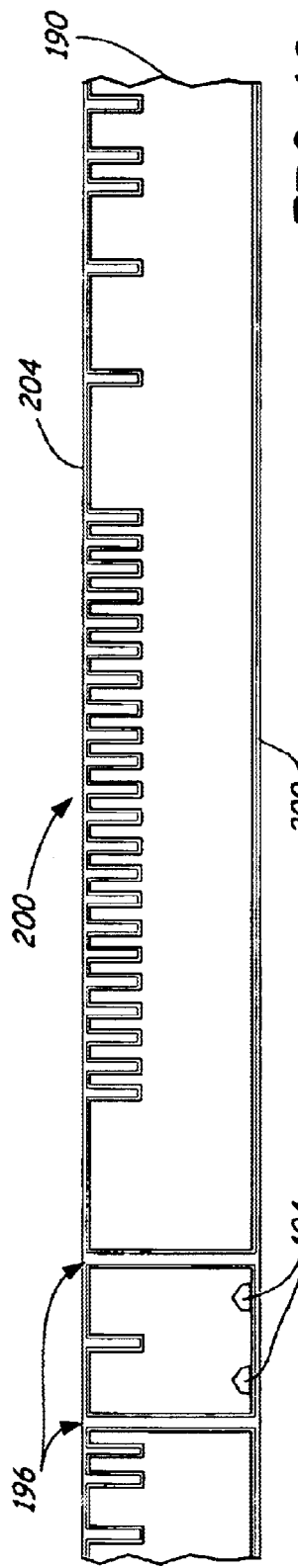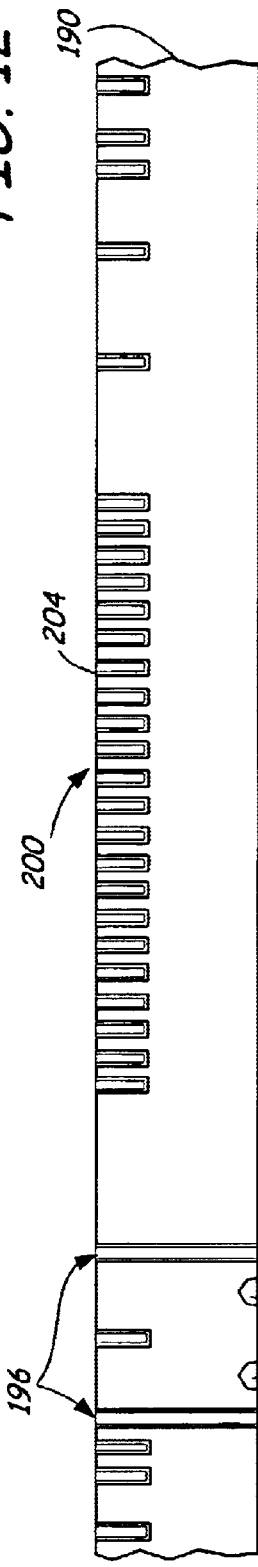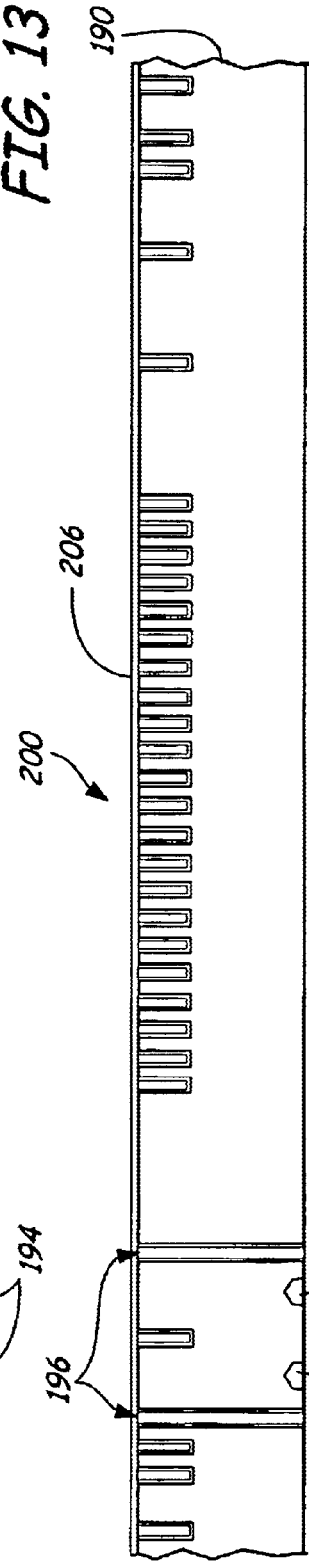

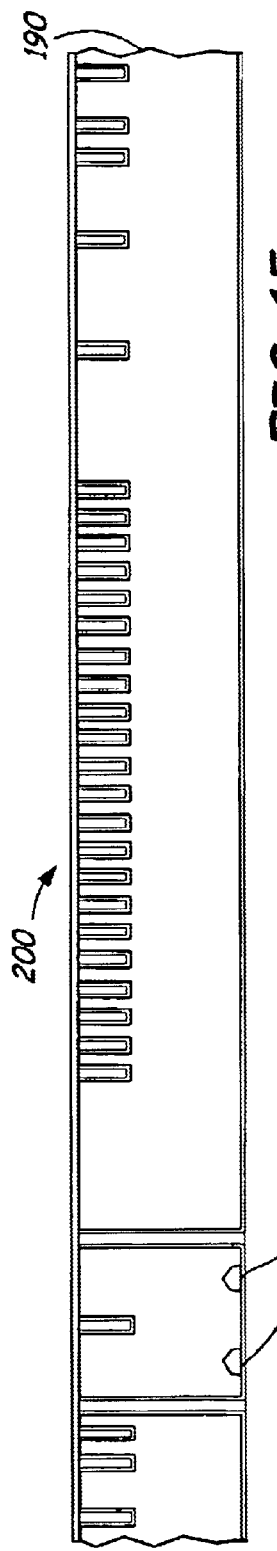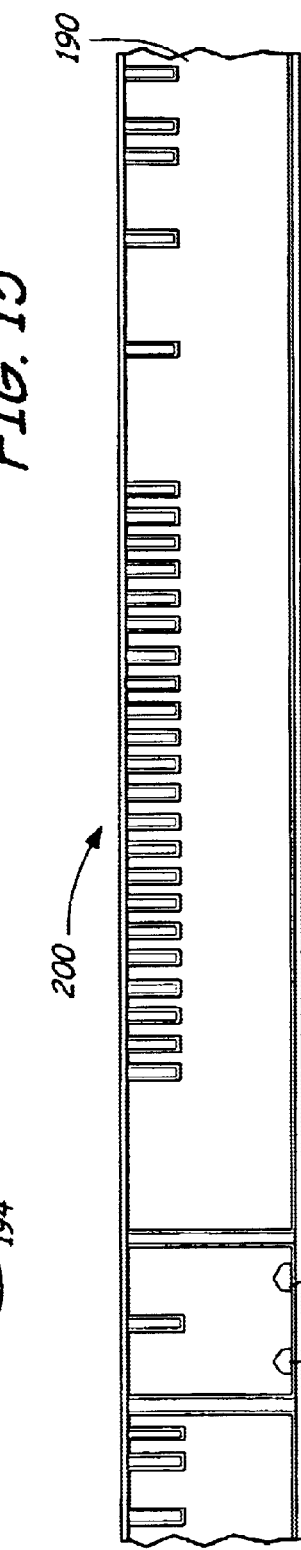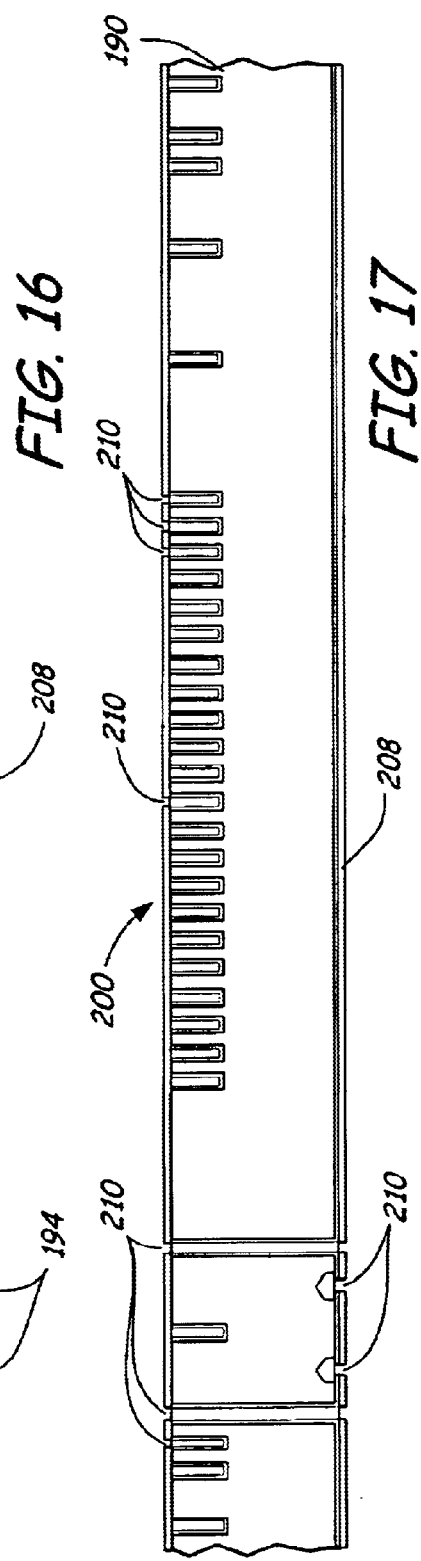

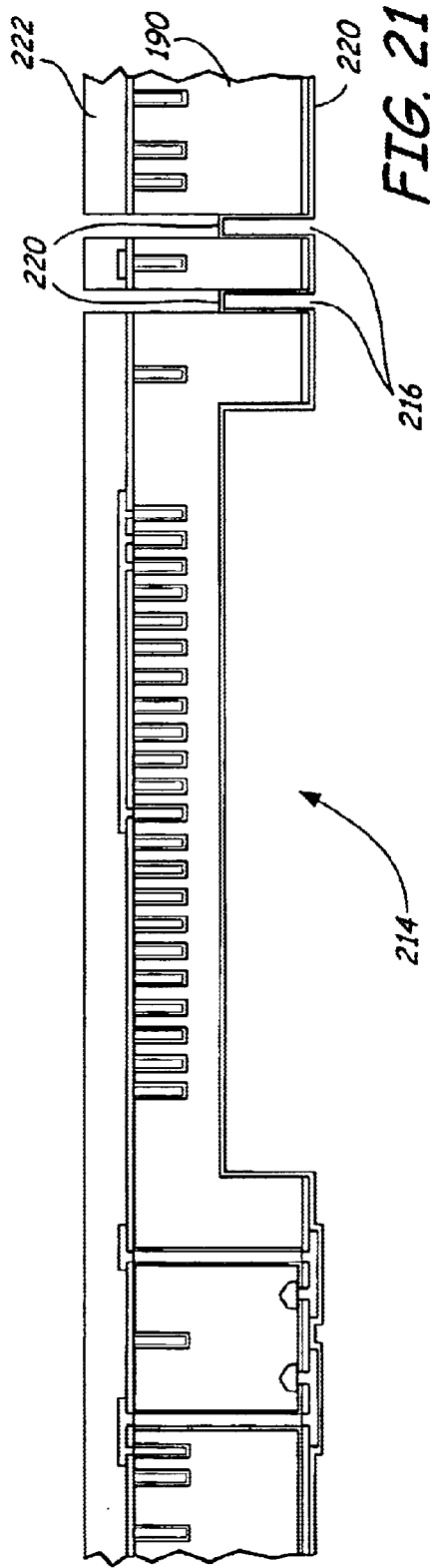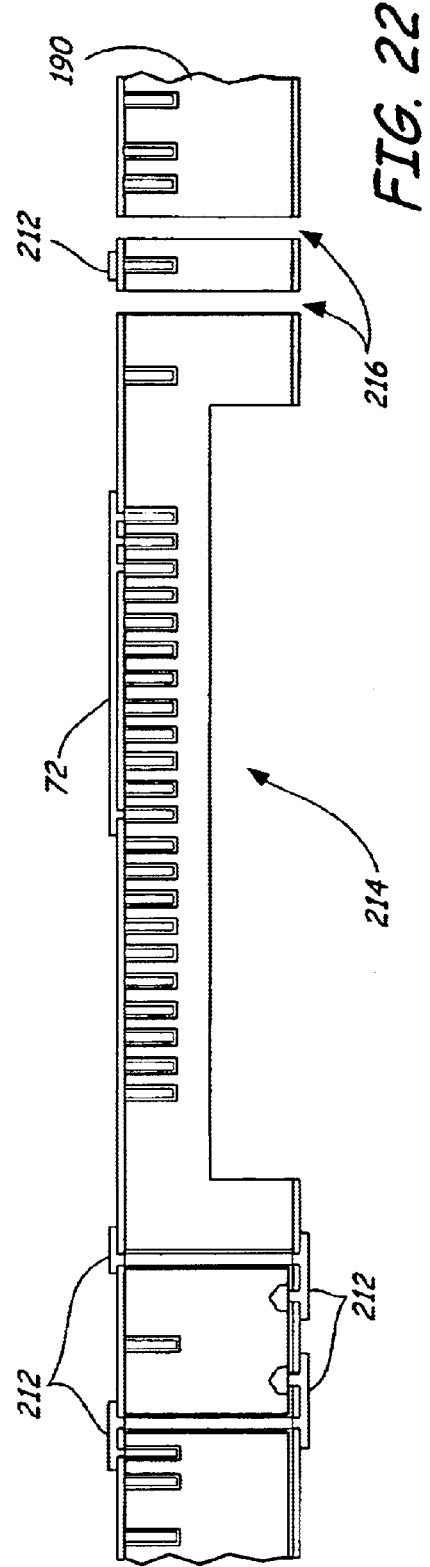

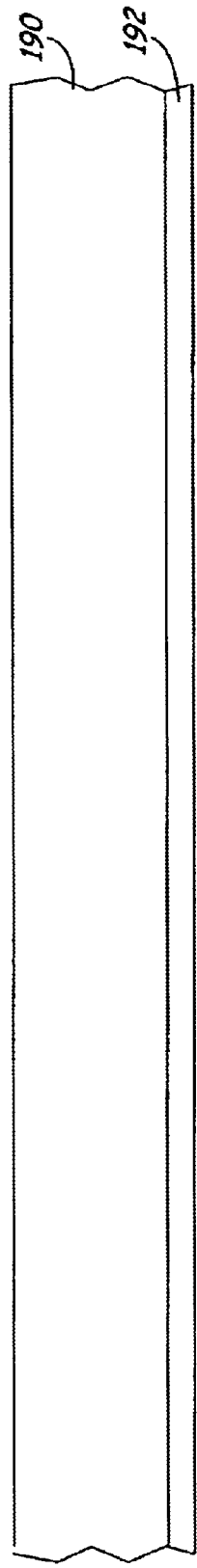
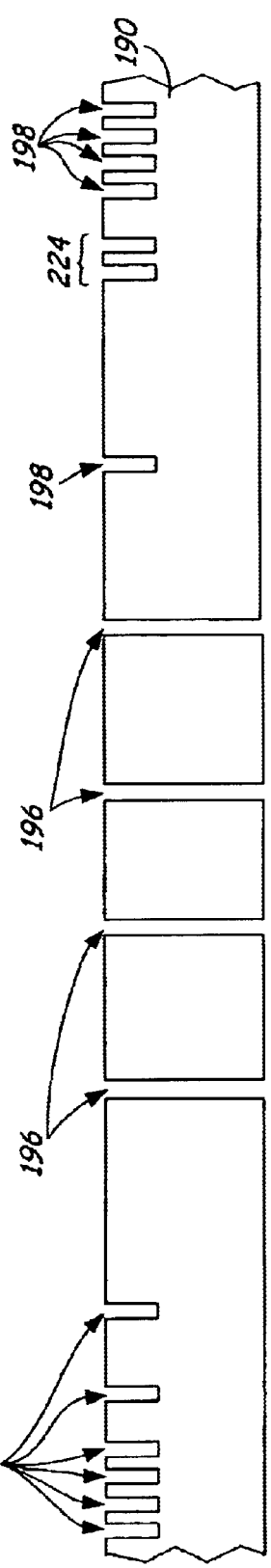
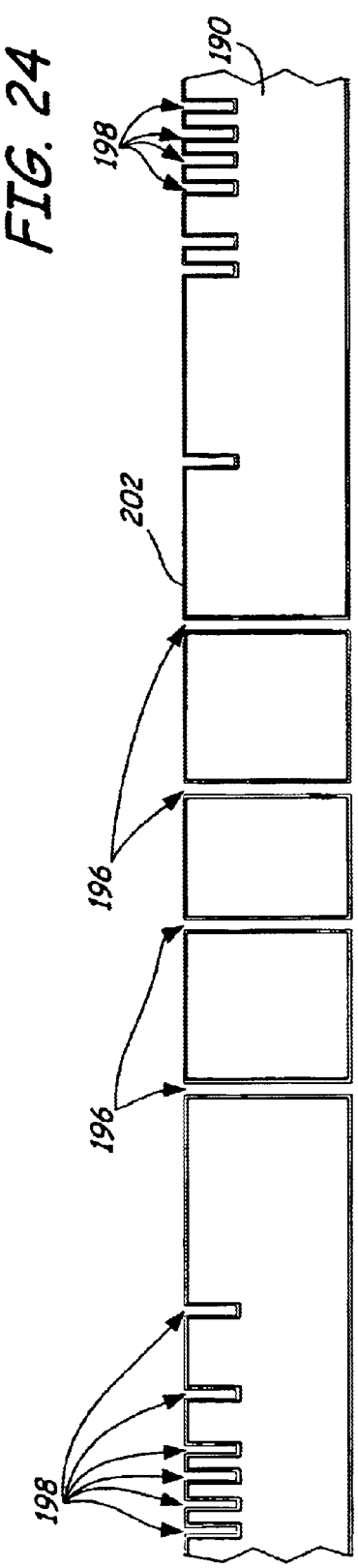

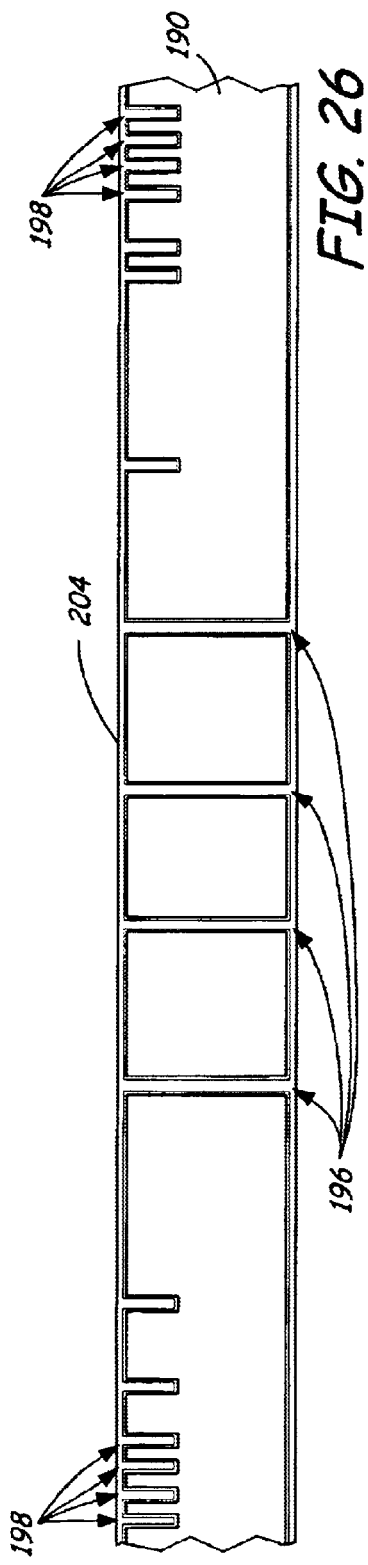
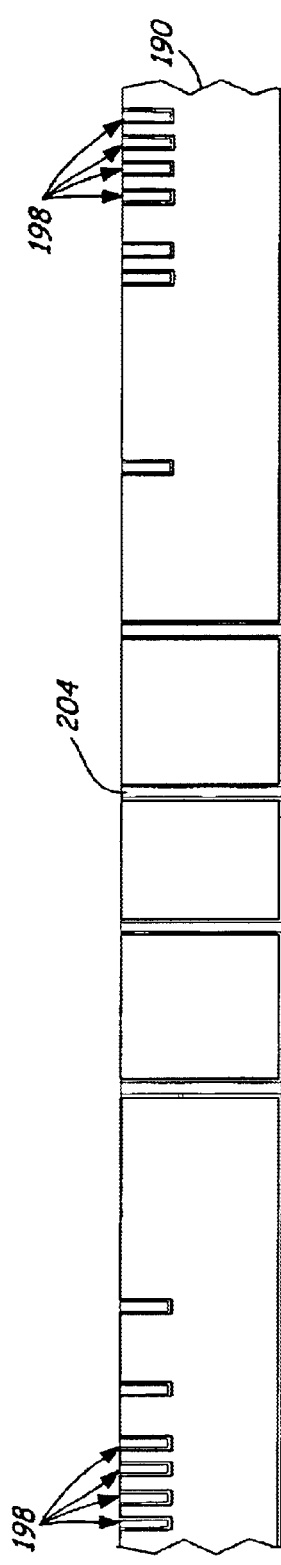
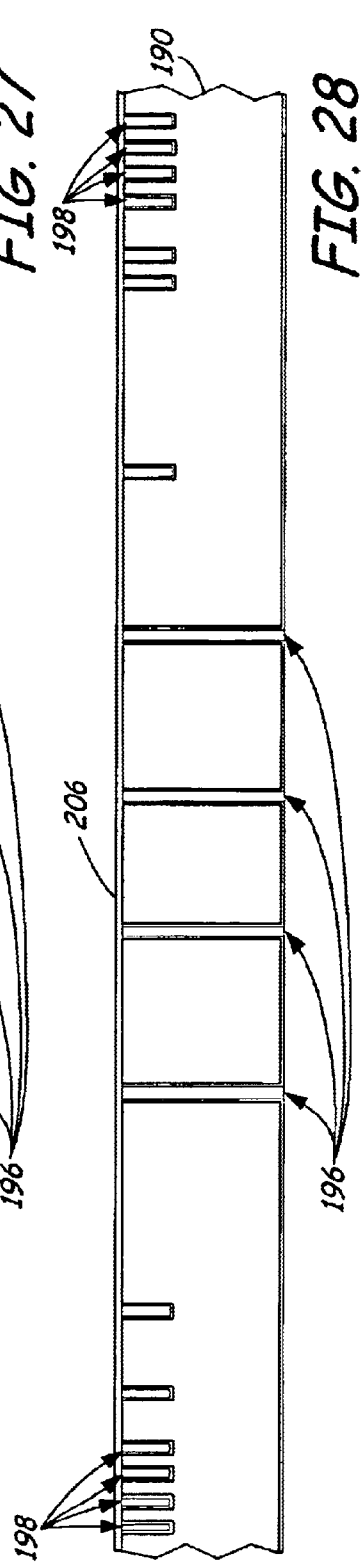

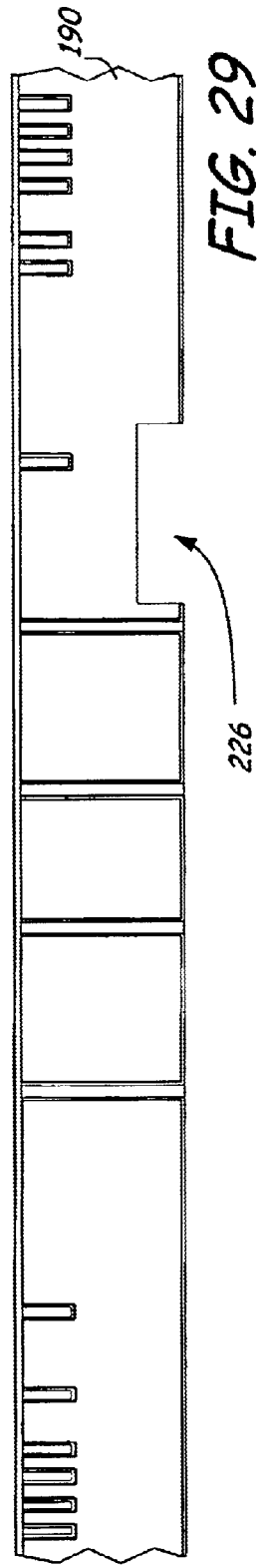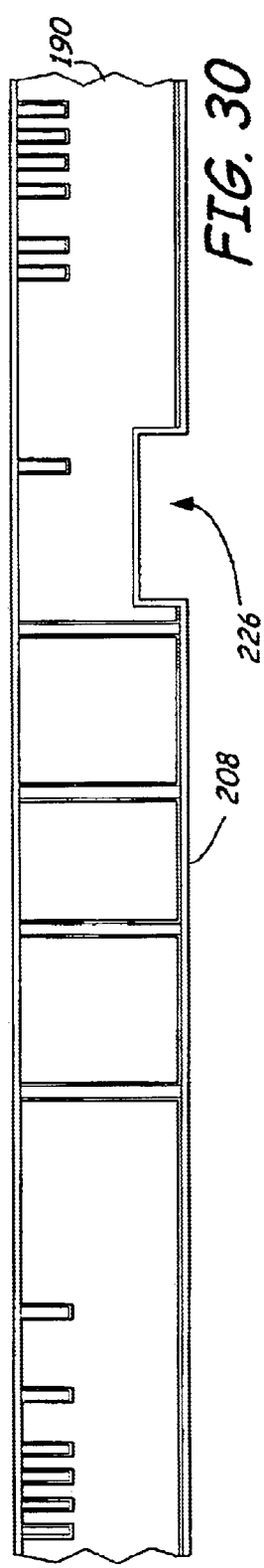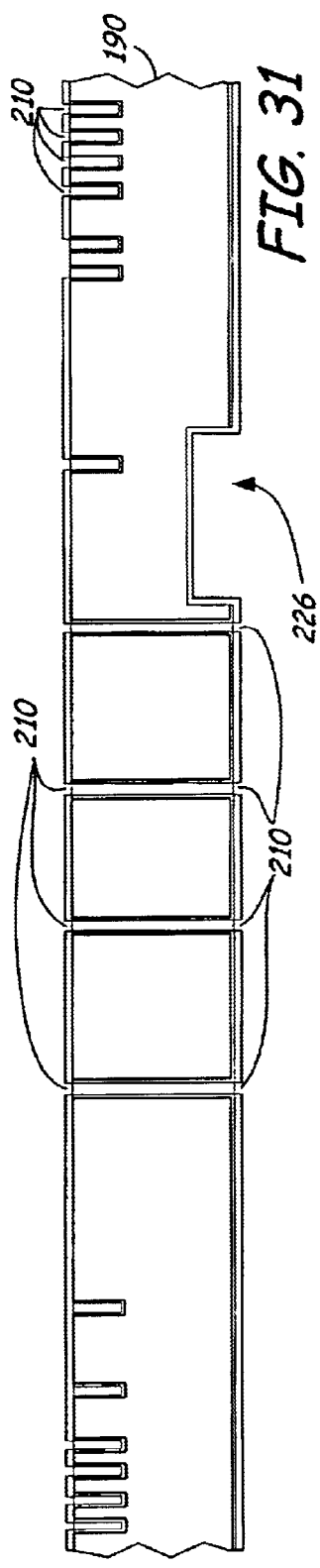

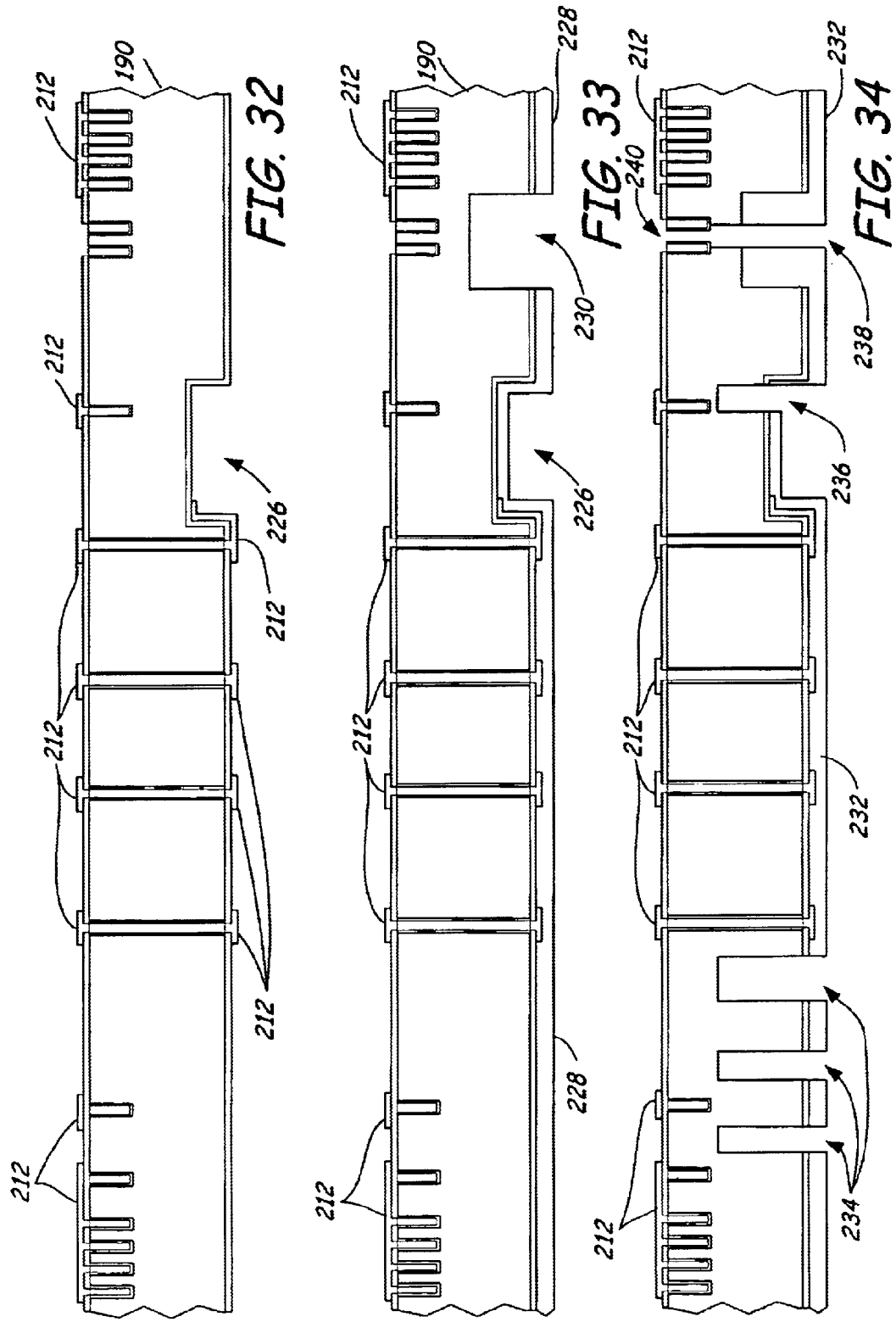

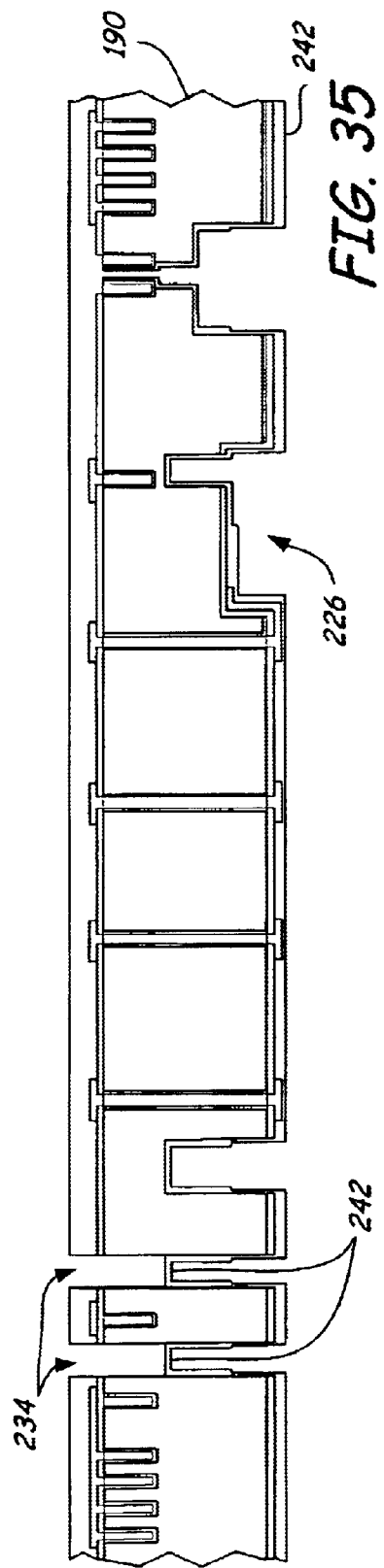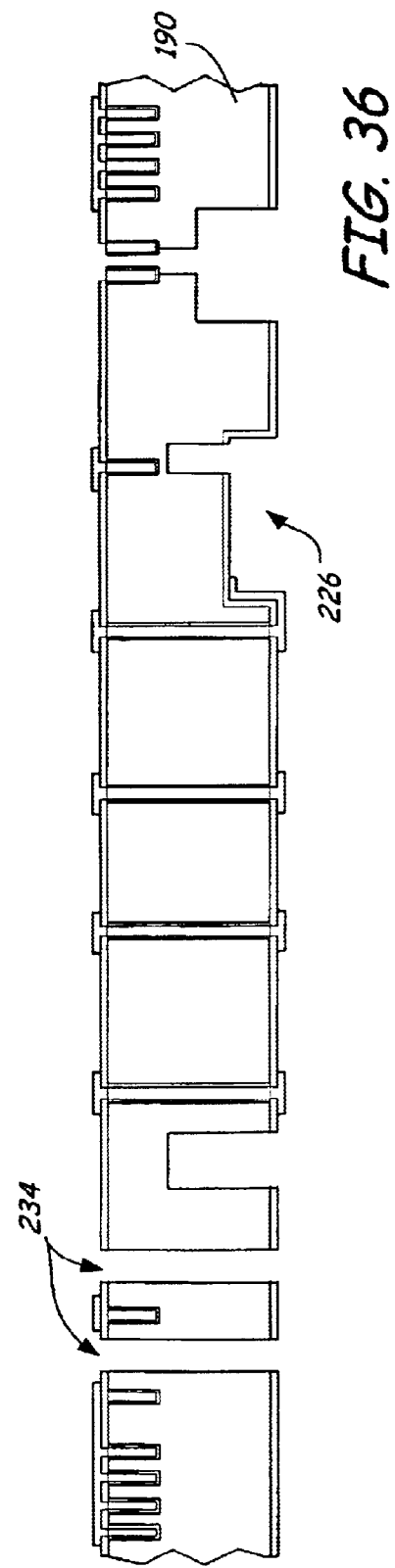

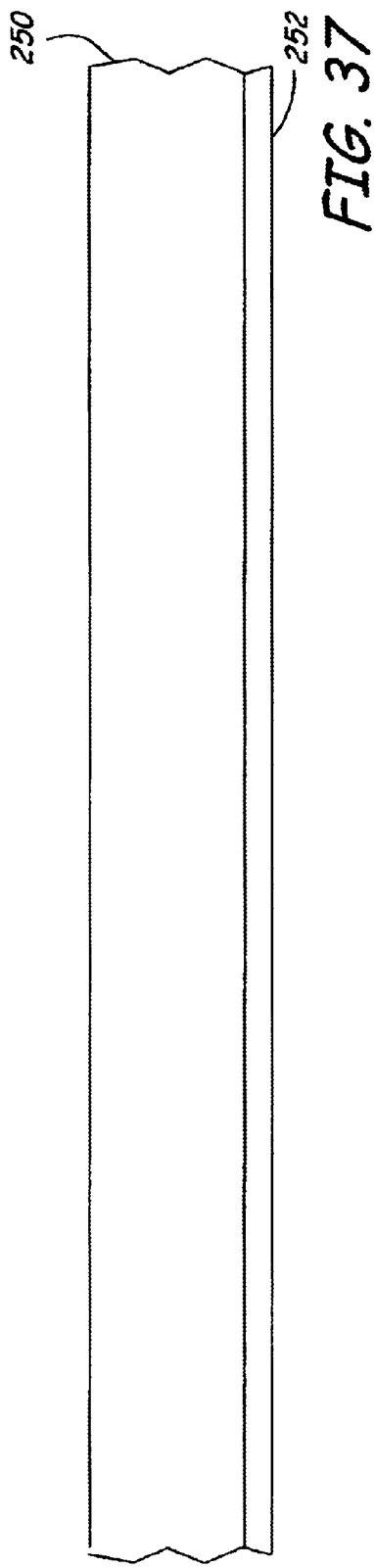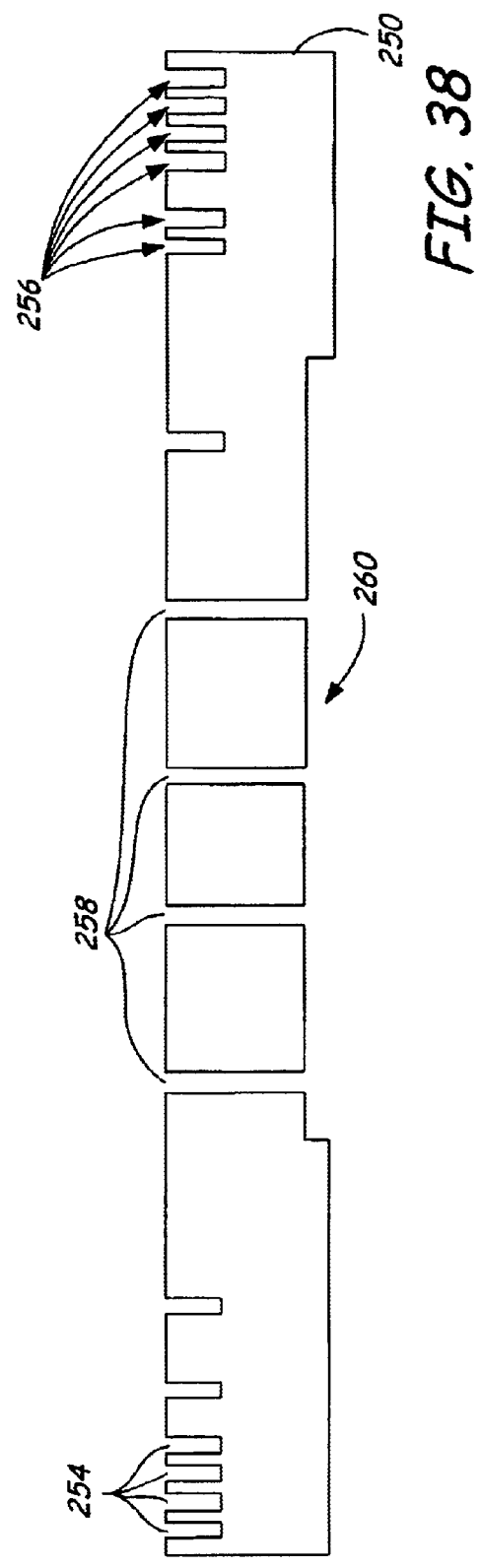

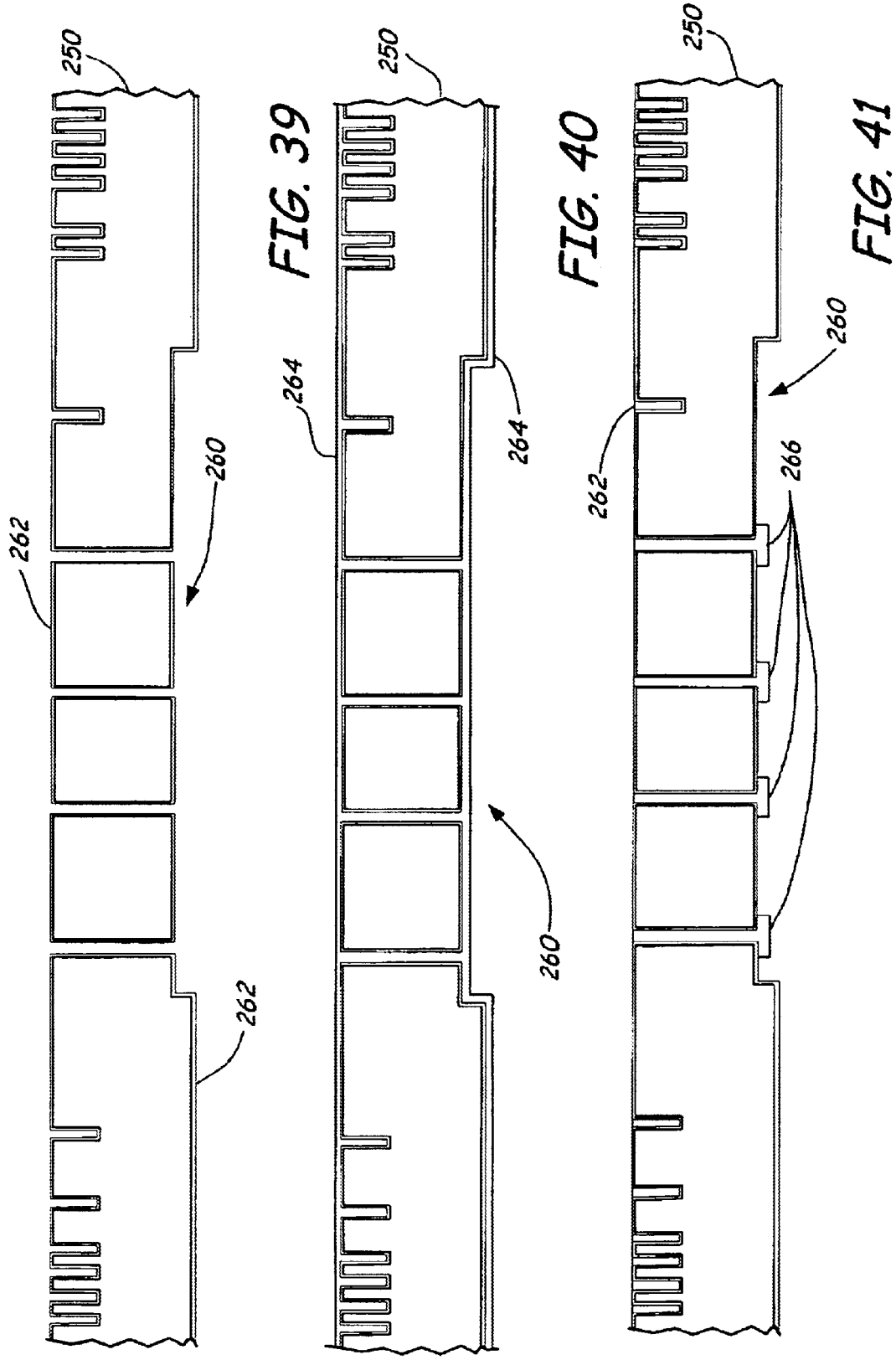

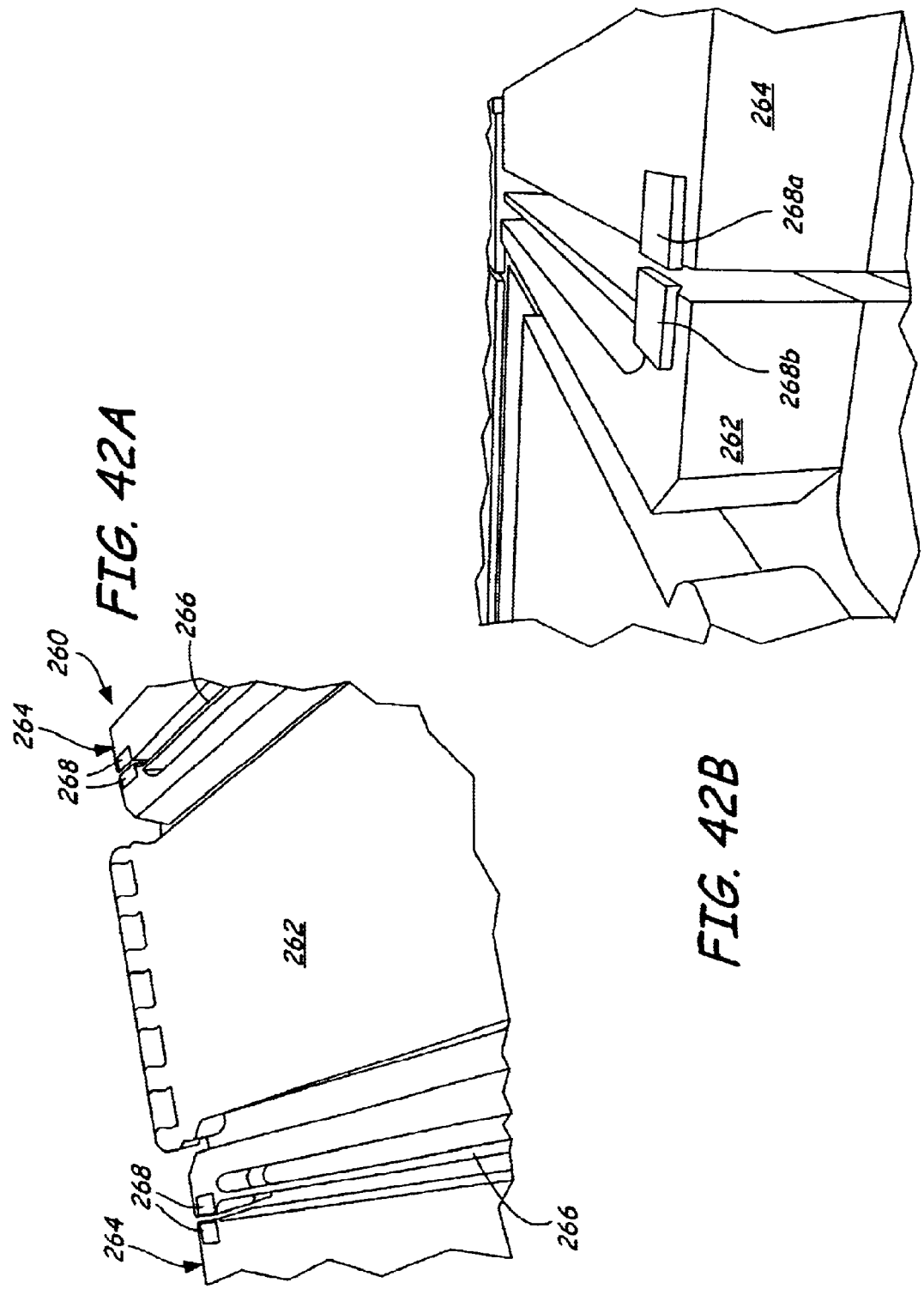

MAGNETIC MICROACTUATOR FOR DISC WITH INTEGRATED HEAD CONNECTIONS AND LIMITERS DRIVES

CROSS-REFERENCE TO RELATED APPLICATION(S)

None.

BACKGROUND OF THE INVENTION

The present invention is related to an improved magnetic microactuator for disc drives having integrated head connections and limiters.

Disc drive systems are well-known in the art and comprise several discs, each disc having concentric data tracks for storing data. The discs are mounted on a spindle motor, which causes the discs to spin. As the discs are spinning, a slider suspended from an actuator arm "flies" a small distance above the disc surface. The slider carries a transducing head for reading from or writing to a data track on the disc.

In addition to the actuator arm, the slide suspension comprises a bearing about which the actuator arm pivots. A large scale actuator motor, such as a voice coil motor (VCM) is used to move the actuator arm over the surface of the disc. When actuated by the VCM, the slider can be moved from an inner diameter to an outer diameter of the disc along an arch until the slider is positioned above a desired data track on the disc. Called tracking, this method of positioning the slider above the desired track on the disc allows the transducing head on the slider to either read from or write data to a selected track on the disc.

The areal recording density of the disc is typically given in tracks per inch (TPI), which is an indication of the number of tracks per inch along the radius of the disc. There is constant pressure to increase the areal density of discs, and thus increase the number of tracks per inch on the disc. As the tracks per inch increase, the accuracy of the system used to position the transducing head above the desired track on the disc must increase in proportion. In an attempt to improve the tracking ability of the slider, secondary microactuators have been placed between the suspension and the slider.

One such microactuator comprises a stationary portion, or stator, as well as a movable portion, or rotor. The rotor is connected to the stator by compliant springs, which allow the rotor to be movable relative to the stator. To move the rotor, the microactuator comprises a motor system, such as a magnetic circuit having either a moving coil or moving magnet portion.

These current microactuator designs are limited in seek performance because the mass-spring resonant mode of the silicon springs connecting the stator and rotor is excited by the primary VCM during seeking. More specifically, as seek accelerations increase beyond 100 G's, the microactuator motor cannot create enough force to control the rotor position during seek operations. Further, high seek accelerations induce large amplitude ringing of the rotor at the mass spring mode (typically 1,000–3,000 Hz), which unacceptably increases the required settling time. In extreme cases, the rotor may contact the stator at significant velocity. This contact may cause silicon chipping, which creates particles that may cause a catastrophic failure in a disc drive. The contact may also cause silicon cracking, which may eventually lead to the failure of the microactuator device.

In addition to problems associated with increased seek acceleration, there remain challenges to manufacturing microactuators. Currently, the slider is attached to the microactuator using a flex on suspension (FOS) or flex circuit. When connecting the flex circuit to the slider, the relatively large size of the flex circuit results in a fairly coarsely positioned slider. In addition, these mechanical connections have an effect on the stiffness of the microactuator. As a result, it is possible the slider will be positioned on the microactuator having a mechanical bias of as many as 10 microns or more. Previously, this mechanical bias caused by the connection of the head to the flex on suspension was not a problem because the stroke size of the rotor relative to the stator was large enough to accommodate some mechanical bias. Further, the control system of the microactuator could be used to compensate for any such mechanical bias. However, as seek accelerations increase and settling times decrease, it is desirable to limit the stroke size of the microactuator. As a result, any manufacturing processing which results in a mechanical bias when attaching the slider to the microactuator becomes unacceptable.

Thus, there is a need in the art for a microactuator having a decreased stroke size, increased robustness during use at high seek accelerations, and resistance to breakage caused by physical contact between the rotor and stator. Furthermore, there is a need in the art for such a microactuator which is easy to manufacture using existing manufacturing methods.

BRIEF SUMMARY OF THE INVENTION

The present invention is a microactuator design and fabrication method for an improved magnetic microactuator that incorporates mechanical stroke limiters and integrated connections between the flex on suspension and slider bond pads. The stroke limiters (also referred to as seek bumpers) and integrated connections enable low power, mechanically robust operation of the microactuator during high acceleration seek operations. In addition, the present invention allows improved head gimbal assembly (HGA) yield due to the integrated head connections formed on the microactuator. Furthermore, the embodiment allows for integrated piezoresistive position sensors.

The microactuator comprises a stator, a rotor carrying a slider, the rotor being movable with respect to the stator, and a seek bumper system comprising a pliable material located on the stator and the rotor at a location where the rotor contacts the stator during seek operations. The seek bumpers limit silicon-on-silicon contact and reduce the risk of chipping or cracking. In addition to the seek bumpers, the gap between the rotor and stator is made smaller. With a smaller gap, the rotor deflection due to the VCM seek acceleration can be reduced so that the deflection times the spring constant is less than the force available from the microactuator.

To allow for a smaller gap, and to remove mechanical biases, the microactuator is formed having integrated head connections by using buried and surface wires formed on the rotor and the stator. In this way, the connections from the rotor to the head can be made directly, while the connections from the microactuator to the flex circuit can be made at the stator. This allows the desired gap width between the stator and rotor to be sufficiently small, while also removing any flex bias which would result in inadequate space between the rotor and the stator.

BRIEF DESCRIPTION OF THE DRAWINGS

FIGS. 4A–4C are perspective views of a portion of the microactuator showing in detail the bumper pads.

FIG. 6 is a perspective view of a portion of the microactuator showing in detail the bond pads between the slider and the microactuator.

FIG. 7A is a bottom perspective view of the microactuator showing a flat pedestal.

FIG. 7B is a perspective view showing a method of attaching a slider to the microactuator having a flat pedestal.

FIGS. 9–22 illustrate the manufacturing process flow for forming the microactuator feature illustrated by line A–A'.

FIGS. 23–36 illustrate the manufacturing process flow for forming the microactuator feature illustrated by line B–B'.

FIGS. 37–41 illustrate the manufacturing process flow for forming the microactuator feature illustrating the process for manufacturing a microactuator having a flat pedestal taken along cut line B–B'.

FIGS. 42A and 42B are top perspective views showing an alternate bumper system formed of epoxy.

DETAILED DESCRIPTION

Figure 1:
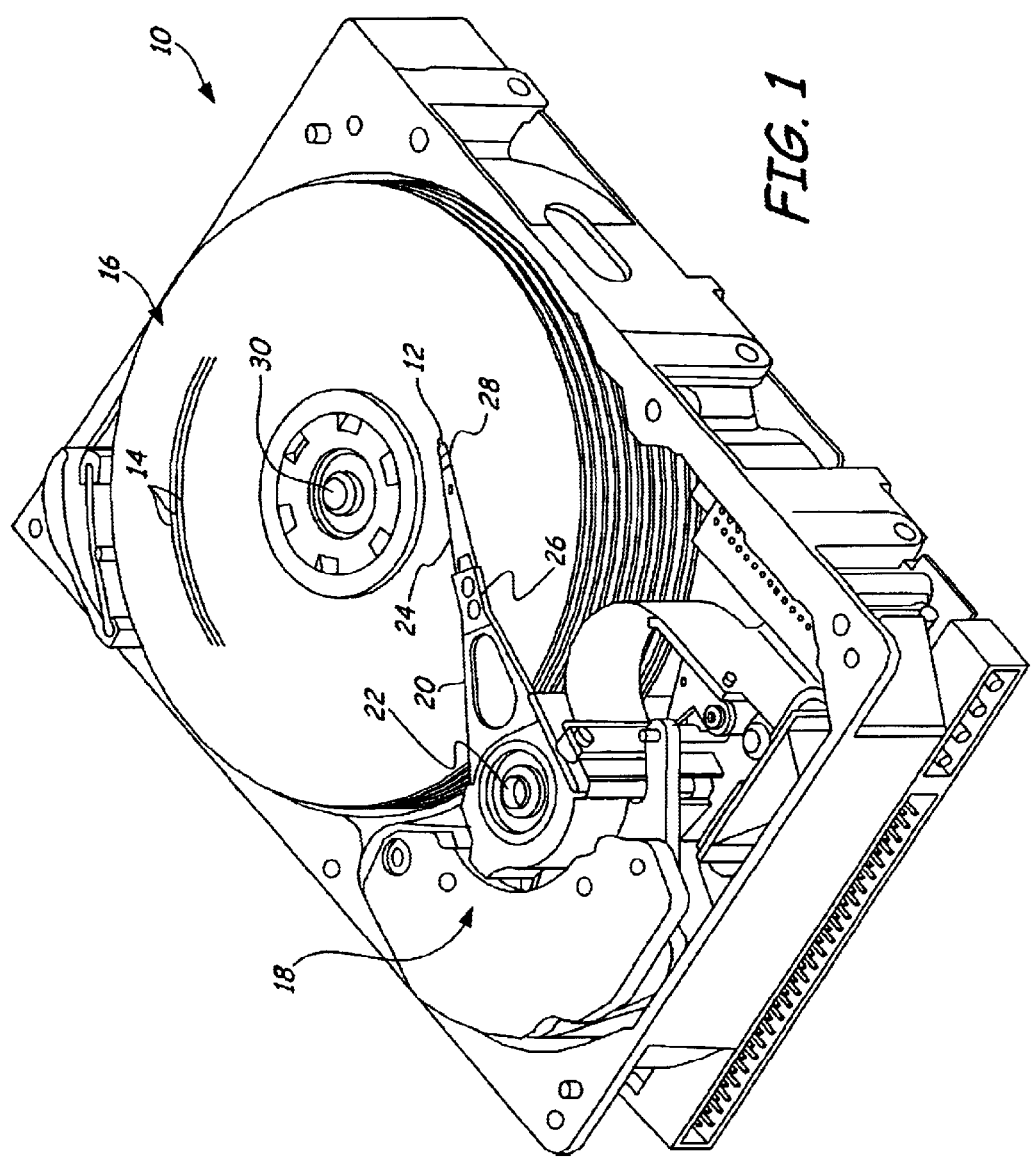
FIG. 1 is a perspective view of a disc drive actuation system for positioning a slider over tracks of a disc.

FIG. 1 is a perspective view of a disc drive actuation system 10 for positioning a slider 12 over a selected data track 14 of a magnetic storage medium 16, such as a disc. The actuation system 10 includes a voice coil motor (VCM) 18 arranged to rotate a slider suspension 20 about an axis 22. The slider suspension 20 includes a load beam 24 connected to an actuator arm 26 at a slider mounting block. A flexure 28 is connected to the end of the load beam 24, and carries the slider 12. The slider 12 carries a magneto-resistive (MR) element (not shown) for reading data and a coil element for writing data on the concentric tracks 14 of the disc 16. The disc 16 rotates around an axis 30, which causes the slider 12 to "fly" a small distance above the surface of the disc 16.

Figure 2:
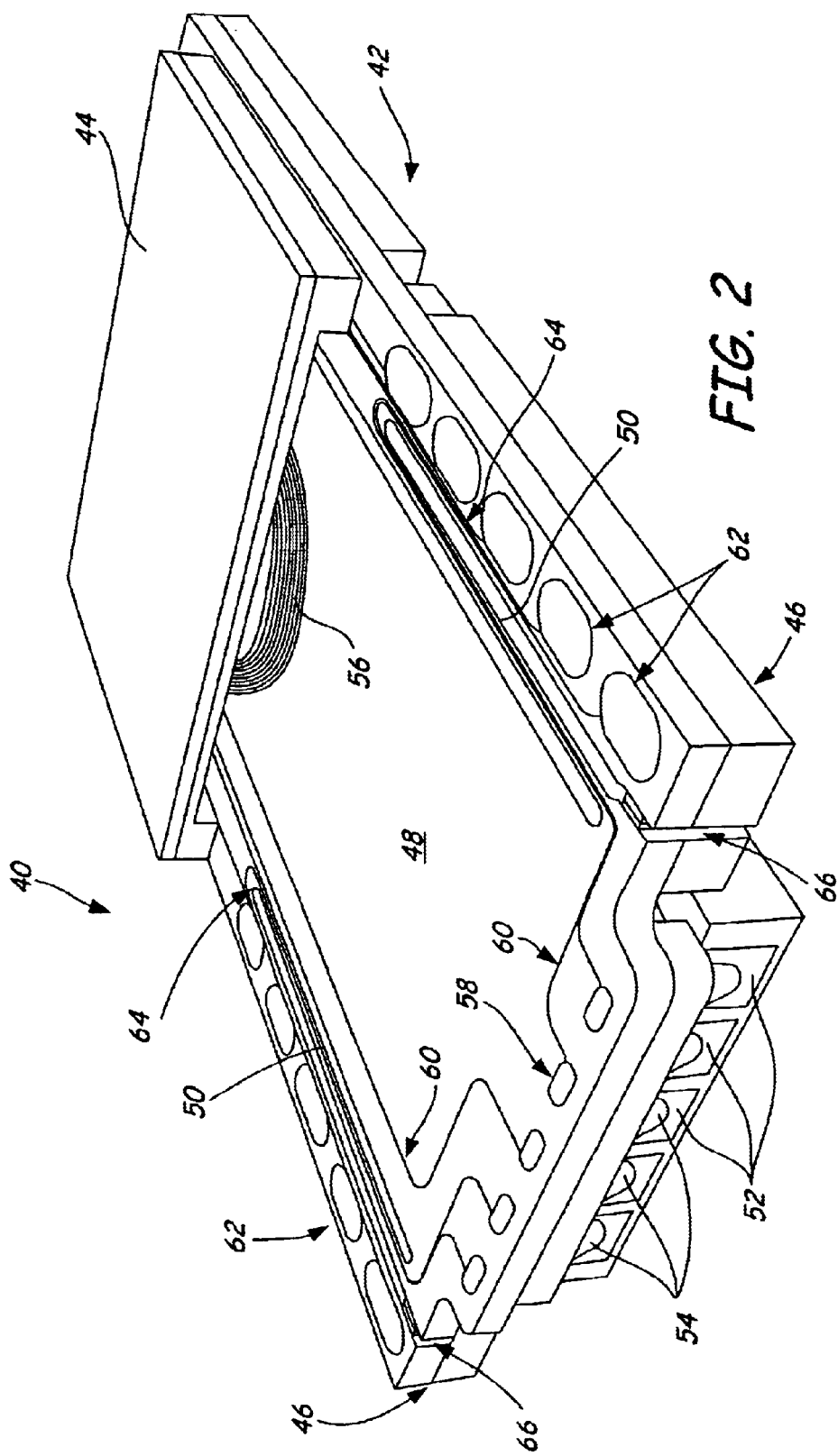
FIG. 2 is a perspective view of a microactuator according to the present invention.

FIG. 2 is a perspective view of a microactuator 40. The microactuator 40 comprises a microactuator body 42 and a magnet containing portion 44. The microactuator body 42 comprises a stator 46 and a rotor 48. The stator 46 is connected to the rotor 48 by a plurality of compliant springs 50. The compliant springs 50 illustrated in FIG. 2 are for illustrative purposes only and the actual number and design of compliant springs 50 may vary. Also shown is the slider 12, slider bond pads 52, and ball bonds 54. Located on a surface of the rotor 48 is a coil 56, slider vias 58, and via wires 60. Located on the stator 46 are bond pads 62 and bond pad wires 64. Slider bumpers 66 are located on the slider body 42 between the stator 46 and the rotor 48.

The slider 12 is connected to the microactuator body 42 using the ball bonds 54. The microactuator 40 functions by providing a current to the coil 56 on the rotor 48. The current through the coil 56, when combined with a magnet carried by the magnet containing portion 44, creates a vertical magnetic circuit which actuates the rotor portion 48 of the microactuator 40. The compliant springs 50 allow the rotor 48 to move relative to the stator 46. Thus, the slider 12 attached to the rotor 48 can be microactuated.

Slider vias 58 on the rotor 48 form an electrical connection from the top side of the microactuator body 42 to the bottom side (as viewed in FIG. 2). The slider 12 connects to the bottom of the microactuator body 42 so that an electrical connection is made from the slider 12 to the vias 58 on the microactuator at the ball bonds 54. In this way, a read or write signal sensed by the slider 12 is transmitted from the slider 12 to the microactuator 40 using vias 58 on the rotor 48. Wires 60 on the top of the microactuator body 42 extend from the vias 56 on the rotor 48 across the compliant springs 50 to the bond pads 62 on the stator 46. From the bond pads 62 on the stator 46, a connection can be made to a flex circuit (not shown) or other remote circuitry.

Figure 3:
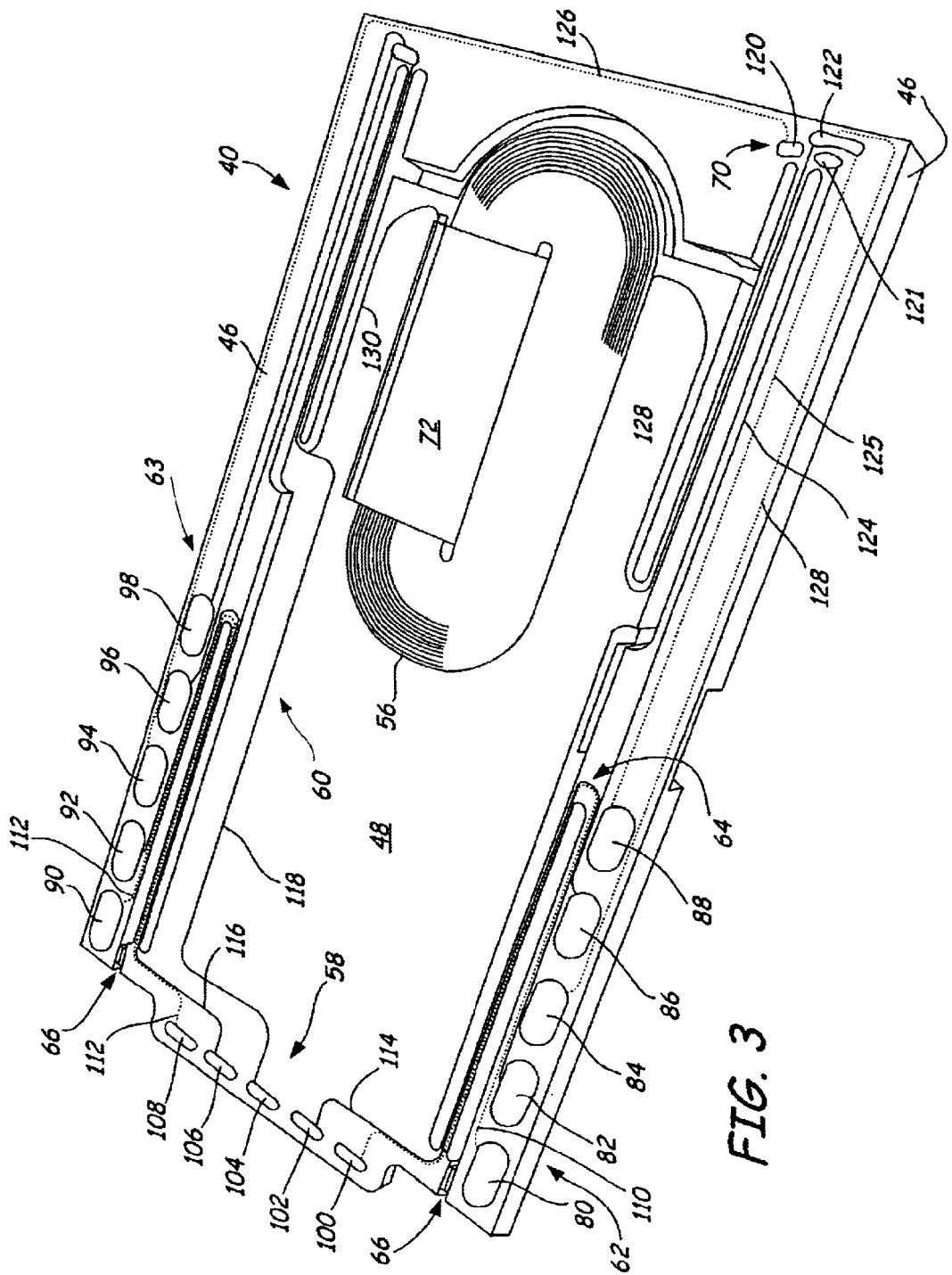
FIG. 3 is a top perspective view of a portion of the microactuator showing the stator and the rotor.

FIG. 3 is a top perspective view of a portion of the microactuator 40 with the magnet portion 44 removed to more clearly illustrate the present invention. Visible is the rotor 48, stator 46, coil 56, head vias 58, via wires 60, stator bond pads 62, and stator wires 64. Also shown are seek bumpers 66 between the rotor 48 and stator 46. Further, a piezoresistive sensor 70 is located at the rear of the microactuator 40 and the coil 56 is provided with the coil jumper 72, which allows current to flow through the coil 56.

Compliant lateral springs and large rotor mass create the requirement to apply large forces to maintain positional control during large-acceleration seeks. As a result, the microactuator motor cannot create enough force to control the rotor position as seek accelerations increase beyond 100 G's. These high seek accelerations induce large amplitude ringing of the rotor at the mass-spring mode, typically 1,000–3,000 Hz, which unacceptably increases settling time. In extreme cases, the rotor may contact the stator at significant velocity, causing silicon chipping or silicon cracking, either of which are highly undesirable.

One solution is to place the seek bumpers 66 on the inside edge of either the rotor 48 or stator 46 or both such that when in contact, the contact occurs at the bumpers 66. This prevents silicon on silicon contact, and reduces the risk of chipping or cracking. In addition to the mechanical benefits of seek bumpers 66, the gap between the rotor 48 and stator 46 is made smaller. With a smaller gap, the rotor 48 deflection due to VCM seek acceleration is reduced. This makes it possible to ensure the microactuator has available force that is greater than the deflection times the spring constant of the beams 50 of the microactuator 40. Eliminating the settling time increase by ensuring the microactuator 40 is able to control its own position immediately after the end of the VCM seek greatly improves the functionality of the microactuator 40.

In order to reduce the gap width between the rotor 48 and stator 46, the recording head electrical connection method must be changed. Currently, the FOS circuit is independent of the microactuator body 40 for the recording head leads, so that when assembled it is possible that the FOS may bias the rotor 48 several microns in either direction. If the desired gap width between the rotor 48 and stator 46 is sufficiently small such that the flex bias created by the FOS moves the recording head to where there is not adequate space between its edge and the bumper 66, the electrical connections must be routed to remove the flex bias. One method to eliminate the flex bias is to integrate the electrical leads into the silicon body of the microactuator 40 and route them from the rotor 48 to the stator 46 where they can then be connected to the flex circuit without creating any mechanical bias of the rotor 48.

FIG. 3 illustrates one embodiment of routing the necessary electrical connects to the stator 46. To do so, the connections make use of both surface beam wires and embedded beam wires, as well as through-wafer vias. More specifically, in one embodiment illustrated in FIG. 3, the bond pads 62 on the lower portion of the stator 46 (as viewed in FIG. 3) comprise a first write bond pad 80, a first read bond pad 82, coil bond pad 84, a piezoresistive sensor voltage source bond pad 86, and a piezoresistive sensor voltage sense bond pad 88. Located on the upper portion of the stator 46 (as viewed in FIG. 3) is a second write bond pad 90, and second read bond pad 92, a piezoresistive sensor voltage ground bond pad 94, a slider ground bond pad 96, and a second coil bond pad 98.

On the rotor 48, the head vias 58 comprise a first write via 100, and first read via 102, a slider ground via 104, a second read via 106, and a second write via 108. The first and second write head vias 100, 108 are connected to the write bond pads 80, 90 on the stator 46 by buried wires 110 and 112. The first and second read via 102, 106 are connected to the first and second read bond pads 82, 92 on the stator 46 using surface wires 114 and 116. The slider ground via 104 is connected to the slider ground bond pad 96 using a surface wire 118.

To monitor the relative position of the rotor 48 with respect to the stator 46, it is common to use some form of sensor, such as a piezoresistive sensor 70 integrated into the spring flexure. When such a sensor is used, the connections to the piezoresistive sensor are likewise formed using surface and embedded wires on the stator 46.

The piezoresistive sensor 70 comprises a voltage ground via 120, a voltage source via 121, and a voltage sense via 122. The piezoresistive sensor voltage source bond pad 86 is connected to the voltage source via 121 using a buried wire 124. The piezoresistive sensor voltage sense bond pad 88 is connected to the voltage sense via 122 using a second embedded wire 125. The ground bond pad 94 is connected to the voltage ground via 120 using a third buried wire 126.

To actuate the microactuator, current must be provided to the coil 56. The necessary connections to the coil 56 are also made using buried wires. Specifically, the first coil bond pad 84 is connected to the coil 54 using an embedded beam wire 128. The second coil bond pad 98 is also connected to the coil 54 using an embedded wire 130.

FIG. 3 illustrates one method of integrating the necessary connections into the microactuator body 42. However, the invention is not limited to any one configuration of surface or embedded wires, their location, or the location of the vias and bond pads. However, it may be preferable to use embedded wire for those applications which require a larger current through the wire. Embedded wires have a larger cross-sectional area, making it possible for the embedded wires to carry larger amounts of current. Thus, the writer portion of the magnetic transducing head, which receives a larger amount of current than the reader portion, is connected on the microactuator 40 using embedded wires 110, 112. Similarly, the connections to the reader portion of the magnetic transducing head may be formed of surface wires 114, 116, because the reader does not require a large current flow. However, it is possible to use either embedded or surface wires as desired or required to allow for all the necessary connections between the head and the flex circuit.

FIG. 4A is a perspective view of a detail of the microactuator more clearly illustrating the seek bumpers 66. FIG. 4A illustrates a portion of the rotor 48 and a portion of the stator 46, as well as a portion of the beams 50 which movably connect the rotor 48 to the stator 46. Located between the rotor 48 and stator 46 is the seek bumper 66, comprising first and second bumper pads 140, 142. The first bumper pad 140 is located on the rotor 48, while the second bumper pad 142 is located on the stator 46.

The bumper pads 140, 142 may be formed of any suitable material which is capable of absorbing the stress caused when the rotor 48 contacts the stator 46. Specifically, the bumper pads 140, 142 may be formed of a metal or epoxy material. Furthermore, the location of the bumper pads 140, 142 may be any suitable location between the rotor 48 and the stator 46 such that any chipping or cracking caused by contact between the rotor 48 and stator 46 is reduced or eliminated. Most preferably, the bumper pads 140, 142 are positioned near a top surface of the microactuator 40. In addition, the bumpers may be recessed from the top or bottom surface of the microactuator.

It is preferred to form the bumper pads 140, 142 so that the pads 140, 142 are large enough to extend away from the rotor 48 and the stator 46 so that any contact between the rotor 48 and stator 46 occurs at the bumper pads 140, 142, rather than the silicon of the rotor 48 and stator 46. As such, the bumper pads 140, 142 may be of any desired shape or size to achieve this function.

Though a typical gap spacing between the rotor 48 and stator 46 results in a plus or minus 50 micron stroke range, it is desired to reduce this stroke range according to the present invention. Thus, the space between the rotor bumper pad 140 and stator bumper pad 142 is made with a desired gap spacing of approximately −15 microns. However, the invention is not so limited, and any gap spacing which allows the microactuator to function according to the present invention is suitable.

In addition to forming the bumper pads 140, 142 of a metal or an epoxy, it may be possible to form the bumpers 66 of a material which utilizes electrostatic attractive forces to prevent repetitive physical contact between the bumpers 66 during seeks by electrostatically clamping the metal bumpers 66 until the seek is completed. In such an instance, electrical connections to the metal bumpers 66 would need to be added.

Figure 4B:
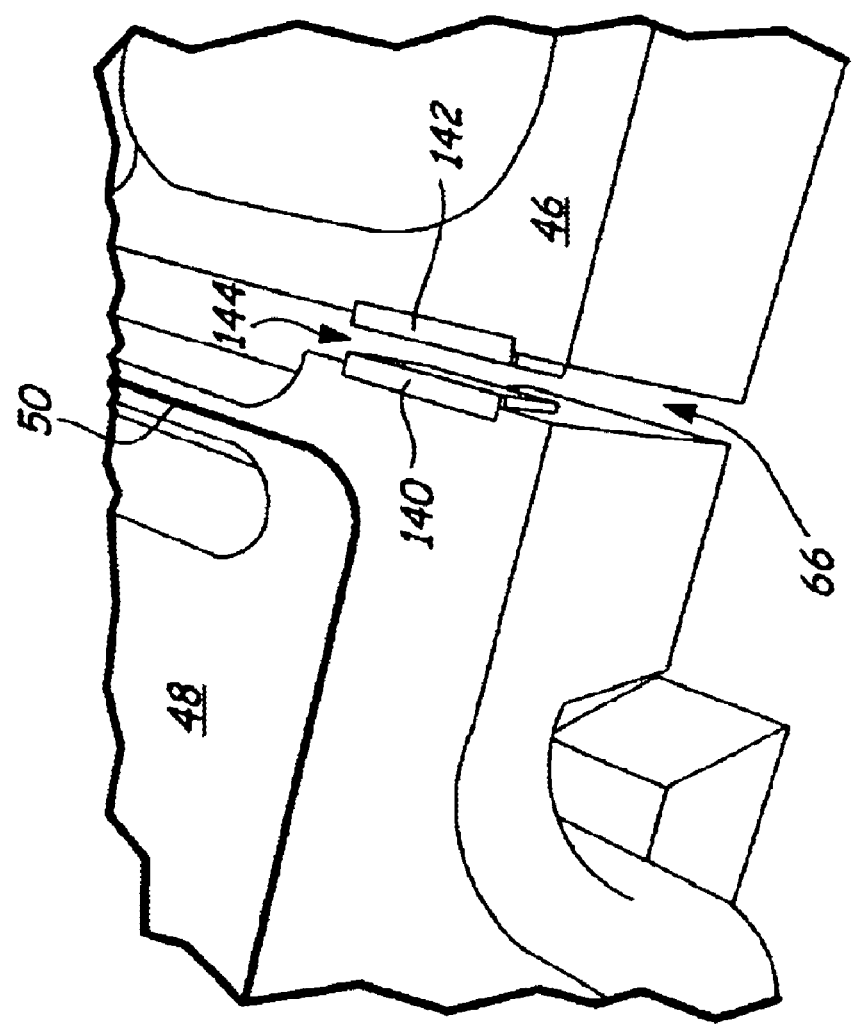
Figure 4C:
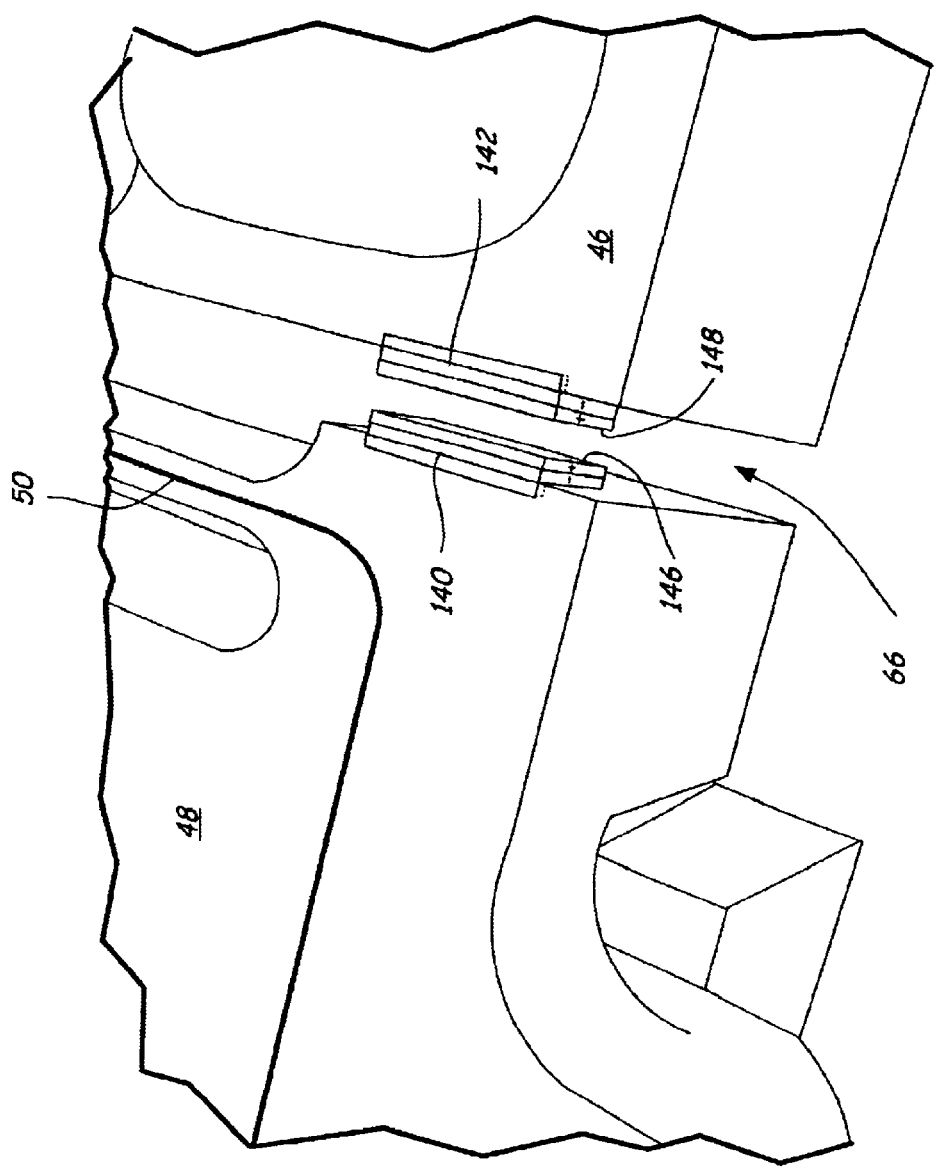

Further, as shown in FIG. 4B, a fluid air bearing 144 between the rotor and stator bumpers 66 could be used to prevent or mitigate contact between the rotor 48 and the stator 46, such as using squeeze film dampers. Further yet, as shown in FIG. 4C, repulsive magnet "virtual bumpers" 146, 148 that use repulsive magnetic forces to minimize or even eliminate the mechanical contact between the rotor 48 and stator 46 may be possible. Finally, though shown in FIGS. 4A–4C with bumper pads 140, 142 located on both the stator 46 and the rotor 48, the invention is not so limited. The bumper 66 may be formed on the rotor 48, the stator 46, or both.

Figure 5:
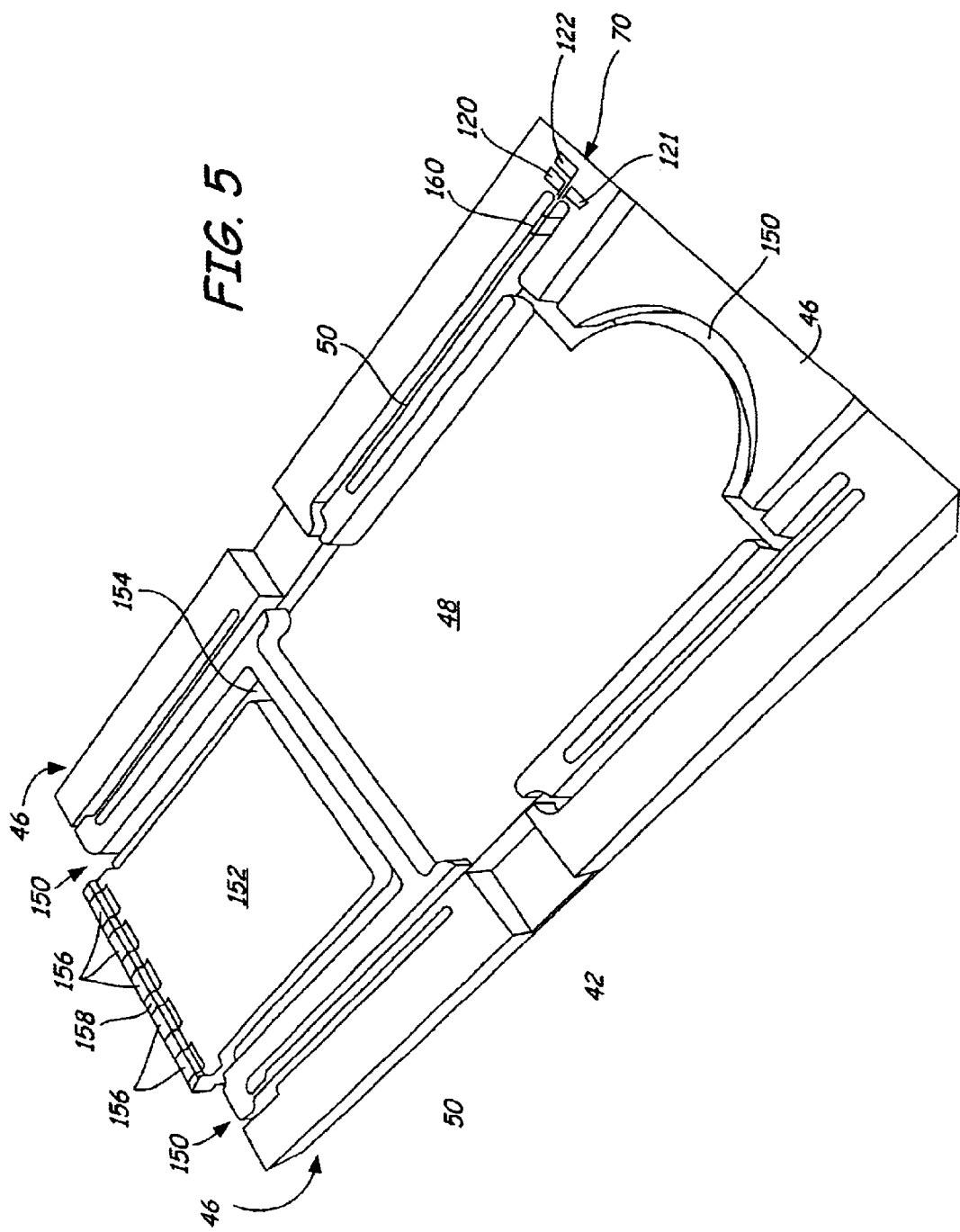
FIG. 5 is a bottom perspective view showing the slider pedestal and head connectors, as well as the piezoresistive sensor.

FIG. 5 is a bottom perspective view of the microactuator 40. Shown in the bottom view of FIG. 5 is the rotor 48 and stator 46. Once again, the flexible beams 50 which connect the stator 46 to the rotor 48 are also visible. A gap 150 separates the rotor 48 from the stator 46 allowing the rotor 48 to move relative to the stator. The rotor 48 also comprises a slider pedestal 152 surrounded by a trench 154. At the top edge of the slider pedestal 152 are the integrated head connections 156 which provide an electrical connection to the top of the microactuator body 42 at the vias 58 (shown in FIGS. 2 and 3). Also located on the slider pedestal 152 is a raised portion 158 which may further serve to align a slider on the slider pedestal 152, and ease connections from the integrated head connections 156 to the slider head connections.

More clearly visible in FIG. 5 is the piezoresistive sensor 70. The piezoresistive sensor 70 comprises piezoresistors 160 located on a beam spring 50. The piezoresistors 160 are connected to the vias 120, 121, 122, which provide a connection from the bottom side of the microactuator 40 visible in FIG. 5 to the top side shown in FIG. 3. Piezoresistive position sensors are known in the art, and typically comprise a resistor bridge wherein two resistors 160 are placed on each side of the beam 50. The differential change in resistance as the beam 50 bends can be measured to determine the deflection of the beam 50.

One reason for locating the piezoresistive sensor 70 on a bottom side of the microactuator 40 is to provide enough space for the piezoresistive resistor 160 located on the beam spring 50. However, the invention is not so limited, and if there is available space on the top surface of the microactuator (FIG. 3) which is not required for any embedded or surface wires, it is possible to form the piezoresistive sensor 70 on a top surface of the microactuator 40.

FIG. 6 is a side perspective view showing a portion of the slider pedestal 152 and a slider 12. Also visible in FIG. 6 is a ball bond source 170. As shown in FIG. 6, the integrated head connections 156 in the form of vias 58 are formed at the raised portion 158 of the slider pedestal 152. As such, the raised integrated head connections 156 provide a location for attaching the slider 12 to the slider pedestal 152. More specifically, the slider 12 can be placed on the slider pedestal so that the ball bond locations 170 are easily matched to the integrated head connectors 156 at the raised portion 158. This arrangement eases the manufacturing process by providing the surface metal conducts to the slider pedestal level.

FIGS. 7A and 7B illustrate an alternate method of attaching a slider 12 to a microactuator 40. Shown in FIG. 7A is a portion of an alternate microactuator 180 with the stator 46, rotor 48, flexible beam springs 50 connecting the two, and a slider pedestal 182. The slider pedestal 182 comprises five integrated head connections 184. In contrast to the previously described slider pedestal, the slider pedestal 182 in FIG. 7A is flat and does not contain a raised portion 158.

FIG. 7B shows an alternate method of attaching a slider 12 to a slider pedestal 182 having no raised portion. In FIG. 7B, the slider 12 bond pads 52 are aligned with the integrated head connections 184 on the slider pedestal 182. Once so positioned, the slider 12 can be attached to the slider pedestal 182 using any suitable method, such as welding or bonding. As shown in FIG. 7B, a plurality of ball bond sources 186 are provided to form the connection between bond pads 52 on the slider 12 and the integrated head connections 184 of the slider pedestal 182. As described more fully below, there are advantages and disadvantages to the two slider pedestal designs shown in FIG. 6 and FIG. 7A, 7B, most of which relate to manufacturing processes.

The method of forming a microactuator according to the present invention is described with reference to FIGS. 9–41 below. One of the main advantages of the present invention is that all features may be formed using conventional manufacturing methods.

Figure 8:
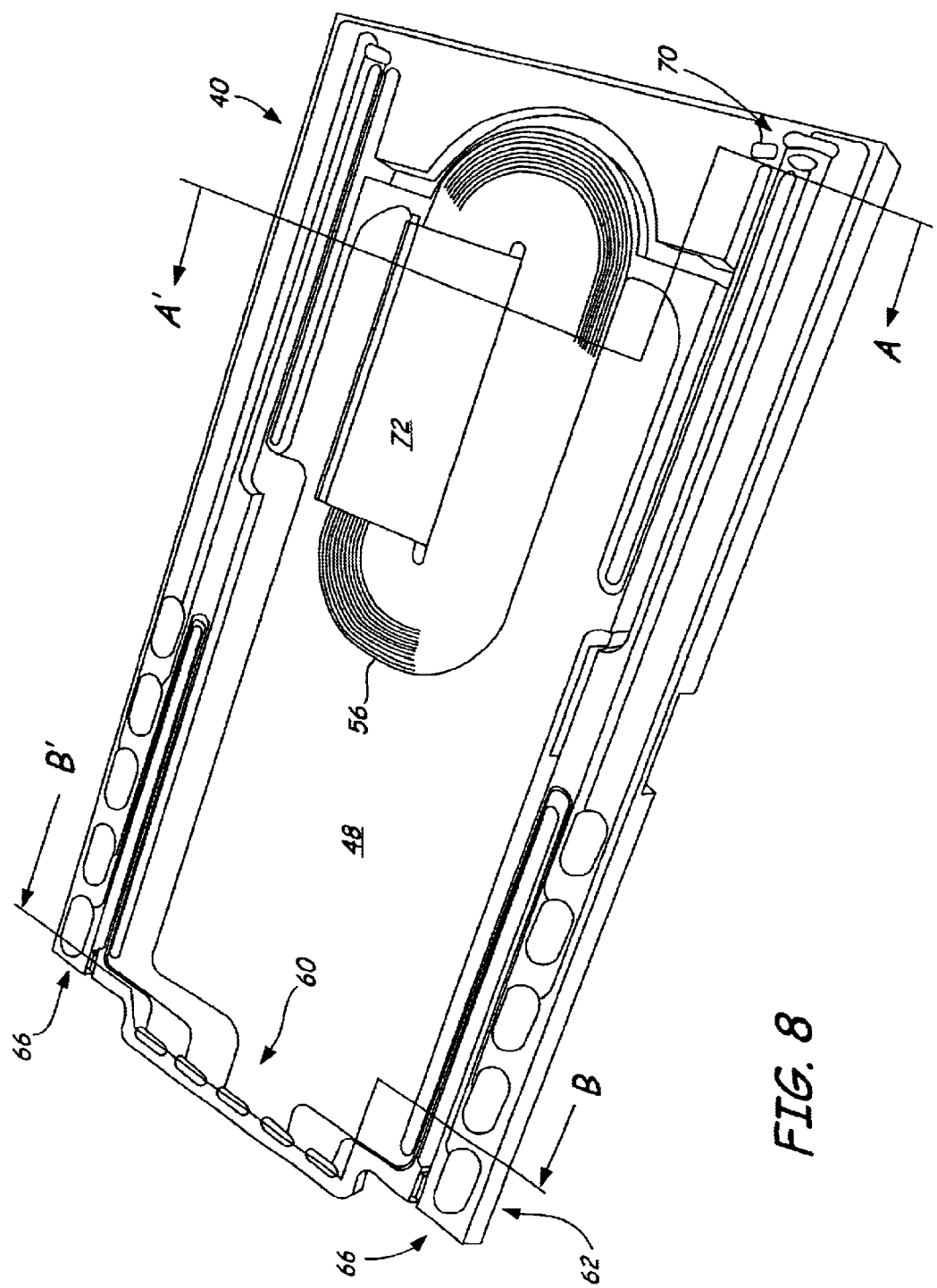
FIG. 8 is a top perspective view of a portion of the microactuator showing lines A–A' and B–B'.

To illustrate, two cut lines are present on FIG. 8. The cut line A–A' illustrates how the features near the coil containing end of the microactuator are formed, while cut line B–B' illustrates how the features near the slider holding end of the microactuator are formed. FIGS. 9–22 illustrate a cross-sectional view taken along cut line A–A' shown in FIG. 3, while FIGS. 23–36 illustrate a cross-sectional view taken along cut line B–B'. The manufacturing process is broken down into fourteen steps. FIGS. 9–22 illustrate fourteen steps of forming the features along A–A'; while FIGS. 23–36 illustrate fourteen steps of forming the features along B–B'.

The process of forming that portion of the microactuator illustrated by A–A' is described first with respect to FIGS. 9–22. Shown in FIG. 9 is a silicon wafer indicated by 190, a layer of photoresist 192, and two piezoresistors 194. Hereinafter, side 1 of the wafer 190 refers to the top side of the wafer, as viewed in FIGS. 9–36, while side 2 of the wafer 190 refers to the bottom. The microactuator is generally formed at the wafer level, using any suitable material, such as silicon. As illustrated in FIG. 9, a first step in forming the microactuator is to form the piezoresistors 194 in the silicon. The piezoresistors 194 are defined using an oxide or photoresist mask 192. The piezoresistors 194 may be formed of any suitable method, such as ion implantation to dope the silicon to create the resistors 194. After doping, the wafer 190 is annealed to diffuse the dopants.

FIG. 10 illustrates the next step in forming the microactuator. As shown in FIG. 10, certain features of the microactuator are formed by etching. Specifically, vias 196 are formed through the wafer 190 to allow for a connection between a top and a bottom surface of the microactuator. In addition, the embedded wires 198, including wires 200 for forming the coil 200 are etched. Next, as shown in FIG. 11, the trenches forming the vias 196 and wires 198, 200 are insulated using any suitable material, such as by applying a layer of silicon nitride 202. After depositing the insulator 202, the trenches 196, 198, 200, are back filled with a metal 204, as shown in FIG. 12. The metal 204 may be any suitable metal for forming the embedded wires, vias, and coil; a particularly suitable metal is copper. In the step illustrated by FIG. 13, a chemical mechanical polish (CMP) is performed on both side 1 and side 2 of the wafer 190 to planarize both surfaces.

In the next step, illustrated in FIG. 14, an insulating nitride 206 is. deposited on side 1 of the wafer 190. The insulating nitride 206 may be deposited using any suitable method, such as PECVD (plasma enhanced chemical vapor deposition). During the next step illustrated in FIG. 15, no feature is formed on the wafer 190 along A–A'. However, as described below with reference to FIG. 28, the slider pedestal is etched on side 2 of the wafer. Due to the cut line A–A', the pedestal recession is not shown in the cross-sectional view of FIG. 15.

Figure 18:
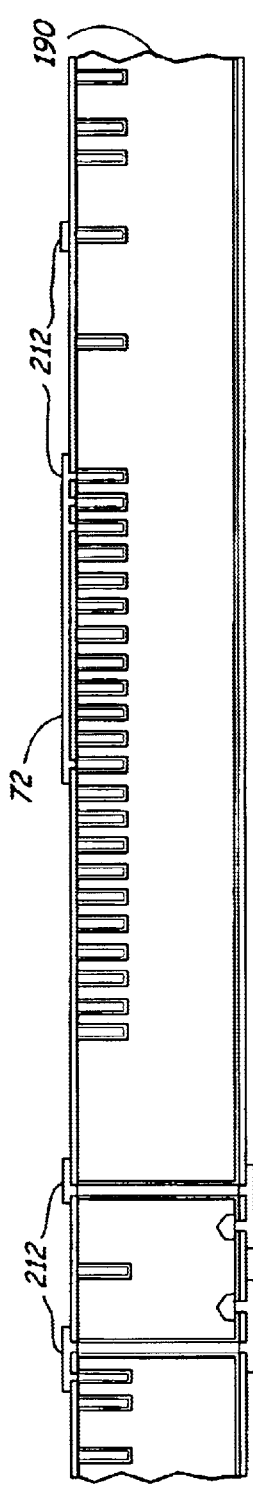
Figure 19:
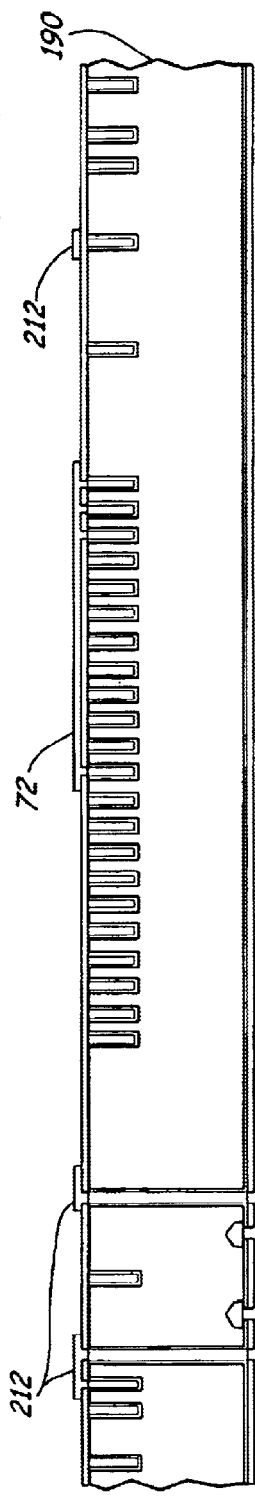

FIG. 16 illustrates the next step in forming the microactuator. Shown in FIG. 16, an insulator 208 is deposited on side 2 of the wafer 190. The insulator 208 may be deposited using any suitable method, such as PECVD. Next, as illustrated in FIG. 17, an etch is performed at the vias 196, some embedded wires 198, and the coil 200. This etch extends through the nitride 206 to the silicon and copper trenches 204, and is performed on side 1 and side 2. The etches are indicated at 210 and provide a location for forming connections to the embedded wires 198 and coil 200. In FIG. 18, a surface metal 212 is deposited and patterned on side 1 and side 2 of the wafer. The surface metal 212 forms connections at the wires 198 and the jumper 72 on the coil 200. The surface metal 212 may be any suitable metal, such as tantalum and/or gold.

During the step illustrated in FIG. 19, once again, no feature is formed on the wafer 190 along cut line A–A'. However, as described below with reference to FIG. 32, the seek bumper etch is performed during this step.

Figure 20:
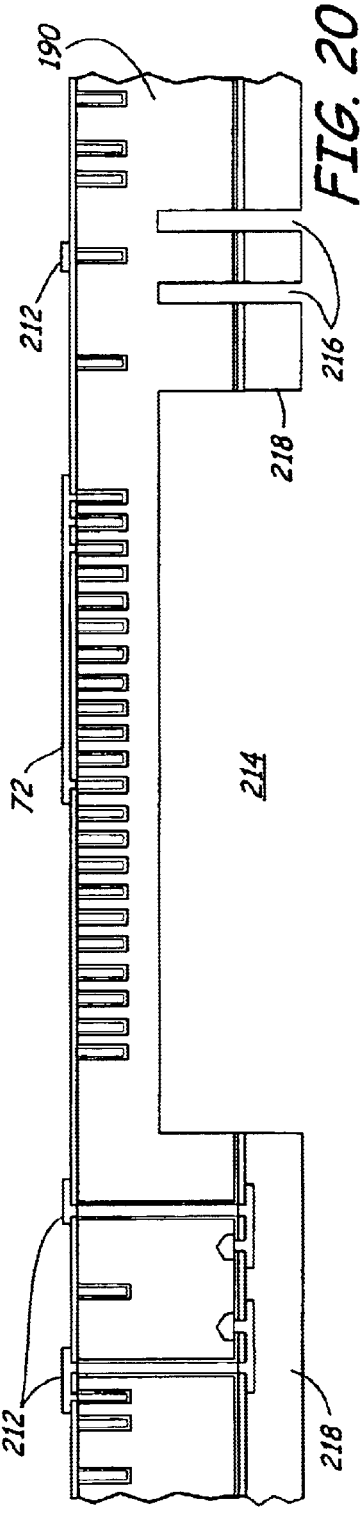

FIG. 20 illustrates the step of etching a tub 214 and the beams 216. In performing this etch, a mask 218 is deposited, the mask is patterned, and a DRIE (deep reactive ion etch)

is performed from side 2 of the wafer 190. FIG. 21 illustrates the next step in forming the microactuator. In FIG. 21, the side 2 etch mask 218 has been stripped. An oxide layer 220 is deposited on side 2, including in the beams 216. The oxide in the beams 216 serves as an etch stop during the following PECVD etch. Also during this step, a mask 222 is applied on side 1 of the wafer 190. The mask 222 is patterned, and an etch is performed in the silicon of side 1. Thus, in step 2, the beams 216 are completed by etching from side 1 of the wafer 190 until the etch stop 220 is reached that has been deposited in side 2. This ensures the etch for the beams 216 results in a high aspect ratio etch.

In a last step, illustrated in FIG. 22, the resist mask 222 is stripped, and the oxide etch stop 222 is etched and released from side 2 of the wafer 190. Thus, FIGS. 9–22 illustrate a standard process method for creating all the features of the microactuator taken along cut line A–A'.

At the same time the process flow illustrated in FIGS. 9–22 are occurring, FIGS. 23–36 illustrate the processes which also occur along cut line B–B' of FIG. 8. FIG. 23 illustrates the first step in forming the microactuator. Shown in FIG. 23 is the wafer 190 and layer of photoresist 192. During this step, the piezoresistive sensors are formed, as illustrated in FIG. 9. However, no features are formed along cut line B–B'.

FIG. 24 illustrates the next step in the process taken along B–B'. In FIG. 24, an etch is performed to create embedded wires 198, several through-wafer vias 196, and the beginning of bumper trenches 224. FIG. 25 illustrates the next step of insulating the trenches 198, vias 196, and bumper trench 224 with a layer of silicon nitride 202. In FIG. 26, the trenches and vias are back filled with a metal 204, such as copper. In FIG. 27, the copper 204 is polished off both side 1 and side 2 of the wafer 190, using any suitable process, such as a chemical mechanical polish. Next, as illustrated in FIG. 28, the insulating nitride 206 is deposited on side 1 of the wafer 190. The nitride is deposited using PECVD.

In FIG. 29, an etch is performed on side 2 to create the pedestal recession 226. In FIG. 30, the insulator 208 is deposited on side 2 of the wafer using PECVD. FIG. 31 shows the next step of etching electrical connections to bond pads through the nitride to the silicon and copper trenches. This etch is performed on both side 1 and side 2 of the wafer 190. These etches are indicated at 210.

FIG. 32 illustrates the step of depositing and patterning the surface metal 212 to form the bond pads and other metalized features on side 1 and side 2 of the wafer 190. FIG. 33 illustrates the step of applying a photoresist pattern 228 on side 2 of the wafer 190. Side 2 is patterned and a deep reactive ion silicon etch is performed from side 2 to form an underside 230 of the seek bumper. As shown in FIG. 34, side 2 is stripped of the etch mask. A second layer of photoresist 232 is applied and a second pattern is developed. As a result of this pattern, a DRIE silicon etch is performed on side 2. During this etch, a first portion of the flexible beams is etched, the slider trench 236 is formed, and an etch is performed to form the flexible beam 238 leaving side bumpers 240. As illustrated in FIG. 35, side 2 is stripped of the photoresist mask. Next, a layer of oxide etch stop 242 is deposited and an etch is performed on side 1 of the wafer 190. During this etch, the remainder of the flexible beams 234 is etched from side 1 to the oxide etch stop of side 2.

Finally, in the step illustrated in FIG. 36, the photoresist mask is stripped from side 1 and the oxide etch stop 242 is etched from side 2. At this point, the wafer is released. Thus, all the features of the microactuator can be made using standard manufacturing processes. The above discussion is merely a summary of this manufacturing process, and those skilled in the art will recognize that fewer or greater steps may be required to form these structures as desired. Similarly, though shown as having a side 1 and a side 2, many of the manufacturing processes involve flipping the wafer over to perform processes on either side. However, FIGS. 9–36 do not indicate this flipping of the wafer, but rather indicate generally the procedures formed on side 1 and side 2 of the wafer.

FIGS. 37–41 illustrate an alternate method of forming the vias through the microactuator. FIGS. 37–41 illustrate a method of forming a microactuator illustrated in FIG. 7A–7B. Specifically, FIGS. 37–41 illustrate forming a microactuator wherein the slider pedestal 48 does not contain a raised portion, but rather is flat. Such a design may have manufacturing advantages, particularly because it is not necessary to apply a pattern over the raised portion of the slider pedestal.

FIG. 37 is a cross-sectional view of a microactuator taken along cut line B–B'. The microactuator comprises a wafer 250. Just as in the previous example, the first step, as illustrated in FIG. 37 is to apply a layer of photoresist 252 to implant the piezoresistive sensors into the silicon. The piezoresistive sensors are not shown in the cross-sectional view taken along cut line B–B', as such FIG. 37 merely illustrates a cross-section of the wafer 250 and the photoresist mask 252.

In a next step illustrated by FIG. 38, the embedded wires 254, bumper trenches 256, and through-wafer vias 258 are etched into side 1 of the wafer 250. The slider pedestal recession region 260 is etched into side 2 of the wafer 250.

Next, as illustrated in FIG. 39, the trenches are insulated with a layer of silicon nitride 262. The trenches are back filled with copper 264, as illustrated in FIG. 40. Then, as illustrated in FIG. 41, a chemical mechanical polish is performed on side 1 to remove the excess copper. On side 2, a chemical mechanical polish, or a wet etch, is performed on the copper of side 2, making sure to leave a bonding surface 266 to accommodate the head bond pads of the slider. In addition to forming the bond pads 266 using some form of etch, additional metal may be deposited on the bonding surface prior to the etch and pattern.

The remaining steps for cross-section B–B' are similar to the standard fabrication method described with reference to FIGS. 23–36 above. As such, the alternative method of forming the microactuator as illustrated in FIGS. 37–41 may be preferred because it simplifies patterning of head bond pads on side 2.

FIGS. 42A and 42B are bottom perspective views of a detail of the microactuator illustrating alternatives for forming the bumpers. Shown in FIG. 42A is a microactuator 260 comprising a rotor 262 and a stator 264. Connecting the rotor 262 to the stator 264 are compliant springs 266. Located at a position between the stator 264 and the rotor 262 along the beams 266 is located a patterned epoxy bumper 268. As shown more clearly in FIG. 42B, the patterned epoxy bumpers 268 are formed so that the bumper 268a is located on a top surface of the stator 264, and extends past a top surface of the stator 264 (as viewed in FIG. 42B). Similarly, the bumper 268b is located on the rotor 262, and is also patterned on a top surface of the rotor 262. The bumpers 268a, 268b are shaped so that the portion of the bumpers 268 that overlap the gap between the rotor 262 and stator 264 are the location of contact should the rotor 262 contact the stator 264. Thus, the bumpers absorb any such stress that occurs when the two parts of the microactuator come into contact.

Although the present invention has been described with reference to preferred embodiments, workers skilled in the art will recognize that changes may be made in form and detail without departing from the spirit and scope of the. invention.

What is claimed is:

1. A microactuator for use with a slider in a disc drive, a microactuator comprising:
   a stator;
   a rotor carrying the slider and movable with respect to the stator; and
   a bumper system located on the stator and the rotor at a location where the rotor contacts the stator during seek operations.

2. The microactuator of claim 1 wherein the bumper system comprises a pliable material located on the stator.

3. The microactuator of claim 1 wherein the bumper system comprises a pliable material located on the rotor.

4. The microactuator of claim 1 and further comprising a gap between the stator and the rotor, wherein the gap is between about 1–15 microns.

5. The microactuator of claim 4 and further comprising integrated head connections allowing a direct connection from the rotor to the slider and a connections from the microactuator to a flex circuit at the stator.

6. The microactuator of claim 5 wherein the integrated head connections comprise vias on the rotor extending from a top surface of the rotor to a bottom surface of the rotor to allow saial slider to be electrically connected to a bottom surface of the rotor.

7. The integrated head connections of claim 6 and further comprising embedded and surface wires routing the head connection from the vias on the top surface of the rotor to bond pads located on the stator.

8. The integrated head connections of claim 6 and further comprising a system of embedded and surface wires for forming an electrical connection to a coil on the rotor, and a piezoresistive sensor.

9. A microactuator having a reduced settling time, the microactuator comprising:
   a stator;
   a rotor connected to the stator using flexible beam springs;
   a gap between the stator and the rotor, wherein the gap is small enough to ensure the microactuator has a rotor force greater than a product of deflection times a spring constant of the flexible beam springs during seek acceleration; and
   a bumper system located between the stator and the rotor.

10. The microactuator of claim 9 wherein the bumper system comprises a pliable material located between the stator and the rotor.

11. The microactuator of claim 9 wherein the bumper system comprises an electrostatic bumper system configured to hold the rotor at a constant distance from the stator during seek operations.

12. The microactuator of claim 9 wherein the bumper system comprises a fluid air bearing between the rotor and stator.

13. The microactuator of claim 9 wherein the bumper system comprises a magnet system creating repulsive magnetic forces which minimize contact between the rotor and the stator during seek operations.

14. The microactuator of claim 9 and further comprising integrated head connections allowing an electrical connections to be made from the rotor to a slider and allowing electrical connections to be made from the stator to a flex circuit.

15. The microactuator of claim 14 wherein the integrated head connections comprise electrical vias extending through the rotor to connect the slider to the rotor.

16. The microactuator of claim 14 wherein the integrated head connections further comprise embedded and surface wires routing the head connections from the rotor to the stator.

17. The microactuator of claim 14 and further comprising a system of embedded and surface wires for forming an electrical connection to a coil on the rotor and a piezoelectric sensor on the stator.

18. A method of forming a magnetic microactuator having integrated head connections and a bumper system, the method comprising:
   forming a piezoresistive sensors on a wafer;
   performing an etch during which through wafer vias for the piezoresistive sensors are formed on the wafer;
   performing an etch during which embedded wires, vias, and a bumper trench are etched;
   applying an insulator;
   filing the etched embedded wires and vias with a metal;
   polishing a top side and a bottom side of the wafer;
   depositing an insulator on a first side of the wafer;
   etching a slider pedestal on a second side of the wafer;
   depositing an insulator on a second side of the wafer;
   etching electrical connections through the insulator and metal at the embedded wires;
   depositing a metal to form electrical connections at the embedded wires;
   beginning an etch of a seek bumper from a second side of the wafer;
   etching a slider tub, a slider trench, and starting an etch of flexible beams from the second side of the wafer; and
   completing an etch of the flexible beams from the first side of the wafer.

19. The method of claim 18 wherein applying an insulator comprising applying a layer of silicon nitride.

20. The method of claim 18 wherein filling the etched embedded wires and vias with a metal comprises filing the embedded wires with copper.

21. The method of claim 18 wherein polishing both sides of the wafer comprises performing a chemical mechanical polish.

22. The method of claim 18 wherein depositing a metal to form electrical connections comprises depositing gold.

* * * * *

UNITED STATES PATENT AND TRADEMARK OFFICE
CERTIFICATE OF CORRECTION

PATENT NO. : 6,831,539 B1
DATED : December 14, 2004
INVENTOR(S) : Roger Lee Hipwell, Jr. et al.

It is certified that error appears in the above-identified patent and that said Letters Patent is hereby corrected as shown below:

<u>Column 11,</u>
Line 32, delete "saial", insert -- said --

Signed and Sealed this

Ninth Day of August, 2005

JON W. DUDAS
*Director of the United States Patent and Trademark Office*